United States Patent [19]

Nakazawa

[11] Patent Number: 5,710,977
[45] Date of Patent: Jan. 20, 1998

[54] APPARATUS FOR MEASURING MULTIPATH PROPAGATION CHARACTERISTICS

[75] Inventor: Isao Nakazawa, Kawasaki, Japan

[73] Assignee: Fujitsu Limited, Kanagawa, Japan

[21] Appl. No.: 472,397

[22] Filed: Jun. 7, 1995

[30] Foreign Application Priority Data

Aug. 31, 1994 [JP] Japan ................... 6-206857

[51] Int. Cl.$^6$ ............... H04B 1/10; H04B 15/00
[52] U.S. Cl. ............... 455/65; 455/504; 455/506
[58] Field of Search ............... 455/52.1, 52.3, 455/65, 67.3, 54.1

[56] References Cited

U.S. PATENT DOCUMENTS

| | | | |
|---|---|---|---|
| 5,289,499 | 2/1994 | Weerackody | 455/52.3 |
| 5,347,535 | 9/1994 | Karasawa et al. | 455/52.3 |
| 5,437,055 | 7/1995 | Wheatley, III | 455/52.3 |
| 5,444,698 | 8/1995 | Kito | 455/54.1 |
| 5,563,909 | 10/1996 | Nakazawa | 375/347 |
| 5,574,983 | 11/1996 | Douzono et al. | 455/69 |
| 5,574,989 | 11/1996 | Watson et al. | 455/52.3 |

Primary Examiner—Reinhard J. Eisenzopf
Assistant Examiner—Marsha D. Banks-Harold
Attorney, Agent, or Firm—Helfgott & Karas, P.C.

[57] ABSTRACT

An apparatus for measuring multipath propagation characteristics receives a plurality of transmitted waves propagated over a plurality of different propagation paths and subjected to multipath fading over the propagation paths, and measures multipath propagation characteristics with respect to those propagation paths based on the received waves. The multipath propagation characteristics can be measured relative to a plurality of propagation path systems using the same frequency band. The apparatus for measuring multipath propagation characteristics comprises a plurality of transmitters located in different spatial positions, respectively, and a receiver for receiving a plurality of waves transmitted from the transmitters while the receiver is moving. The transmitters generate respective waves to be transmitted that each comprise a plurality of discrete spectral components which are arranged in the frequency domain such that they do not overlap each other in the same frequency band. The receiver simultaneously receives the waves which have been transmitted from the respective transmitters and each propagated over a plurality of different propagation routes or paths while being subjected to multipath fading, and measures multipath propagation characteristics relative to the propagation paths based on the received waves.

18 Claims, 18 Drawing Sheets

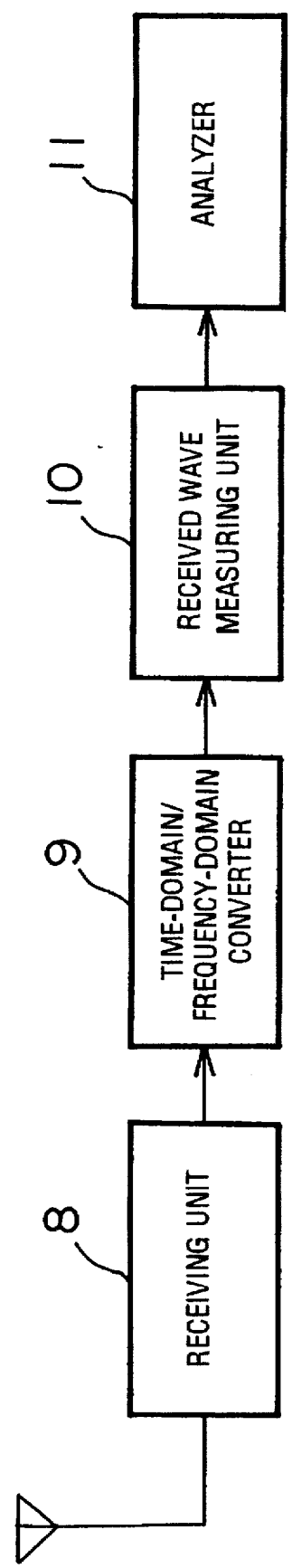

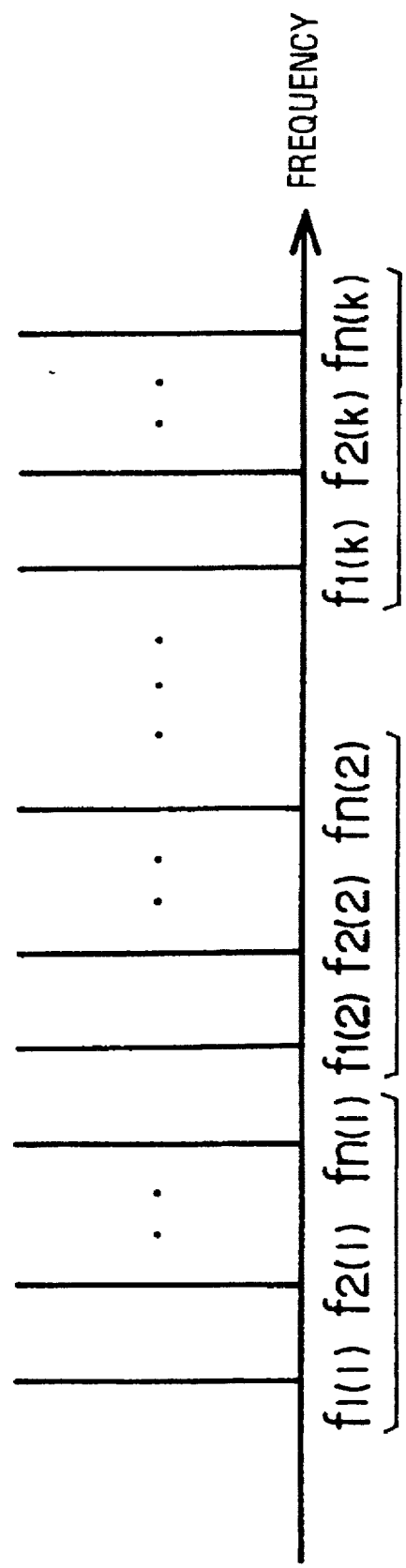

APPARATUS FOR MEASURING MULTIPATH PROPAGATION CHARACTERISTICS

BACKGROUND OF THE INVENTION

1. Field of the Invention

The present invention relates to an apparatus for measuring multipath propagation characteristics, and more particularly to an apparatus for receiving a plurality of transmitted waves propagated over a plurality of different propagation paths and subjected to multipath fading over the propagation paths, and measuring multipath propagation characteristics with respect to those propagation paths based on the received waves.

Recent rapid development and widespread use of mobile communications demand a mobile communication system capable of transmitting data at high speeds. It is necessary to study and recognize multipath propagation characteristics for the development of such a mobile communication system. The present invention is concerned with an apparatus for measuring such multipath propagation characteristics.

2. Description of the Related Art

Generally, when a mobile station moves on an urban road, since the mobile station through standing waves having electric field intensities distributed over the road, the voltage of a signal received by the mobile station varies greatly with time, resulting in so-called multipath fading. In multipath propagation where a transmitted wave is propagated over a plurality of routes or paths before reaching a receiving antenna, multipath fading is frequency-dependent because the electric field intensities are frequency-dependent. A wide-band signal transmitted by way of multipath propagation has its quality lowered by distortions of the spectrum of the wide-band signal.

In order for a mobile communication system to be able to transmit high-quality data at high speeds, therefore, it is necessary to measure multipath propagation characteristics in advance and reflect them in efforts to design such a mobile communication system.

One conventional process of measuring multipath propagation characteristics involves measurement of delay times of multipath propagation. According to this process, delay profiles are measured from delays and received powers caused by multipath propagation.

The above conventional process of measuring delay times of multipath propagation is based on the measurement of multipath propagation characteristics relative to one propagation path system which extends from a base station through a number of routes or paths to a mobile station.

Multipath propagation characteristics are also required to be simultaneously measured relative to a plurality of propagation path systems which extend from a plurality of base stations located in different positions for transmitting signals in the same frequency band, through respective sets of routes or paths, to a mobile station. The multipath propagation characteristics thus measured can be used in attempts to locate the base stations in appropriate positions, prevent signals from interfering with each other in the same frequency band, and carry out diversity reception and diversity transmission. The simultaneous measurement of multipath propagation characteristics is less time-consuming than individual measurement of multipath propagation characteristics relative to the propagation path systems. For this reason, there have been demands for apparatus for simultaneously measuring multipath propagation characteristics relative to a plurality of propagation path systems.

However, the conventional process of measuring multipath propagation characteristics is directed to the measurement of multipath propagation characteristics relative to one propagation path system, but is incapable of simultaneously measuring multipath propagation characteristics relative to a plurality of propagation path systems.

SUMMARY OF THE INVENTION

It is therefore an object of the present invention to provide an apparatus capable of simultaneously measuring multipath propagation charac-teristics relative to a plurality of propagation path systems using the same frequency band.

To achieve the above object, there is provided in accordance with the present invention an apparatus for measuring multipath propagation characteristics based on a plurality of received transmitted waves that have been propagated over a plurality of different propagation paths while being subjected to multipath fading, comprising a plurality of transmitters located in different spatial positions, respectively, for generating respective waves to be transmitted that each comprise a plurality of discrete spectral components which are arranged in the frequency domain such that they do not overlap each other in the same frequency band, and a movable receiver for simultaneously receiving the waves which have been transmitted from the respective transmitters and each propagated over a plurality of different propagation paths while being subjected to multipath fading, and measuring multipath propagation characteristics relative to the paths based on the received waves.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a block diagram of a receiver in the apparatus for measuring multipath propagation characteristics according to the first embodiment of the present invention;

FIG. 5 is a diagram showing the spectrum of a signal received by the receiver;

DETAILED DESCRIPTION OF THE PREFERRED EMBODIMENTS

The principles of the present invention, which underlie various embodiments of the present invention, will first be described below.

Figure 1:
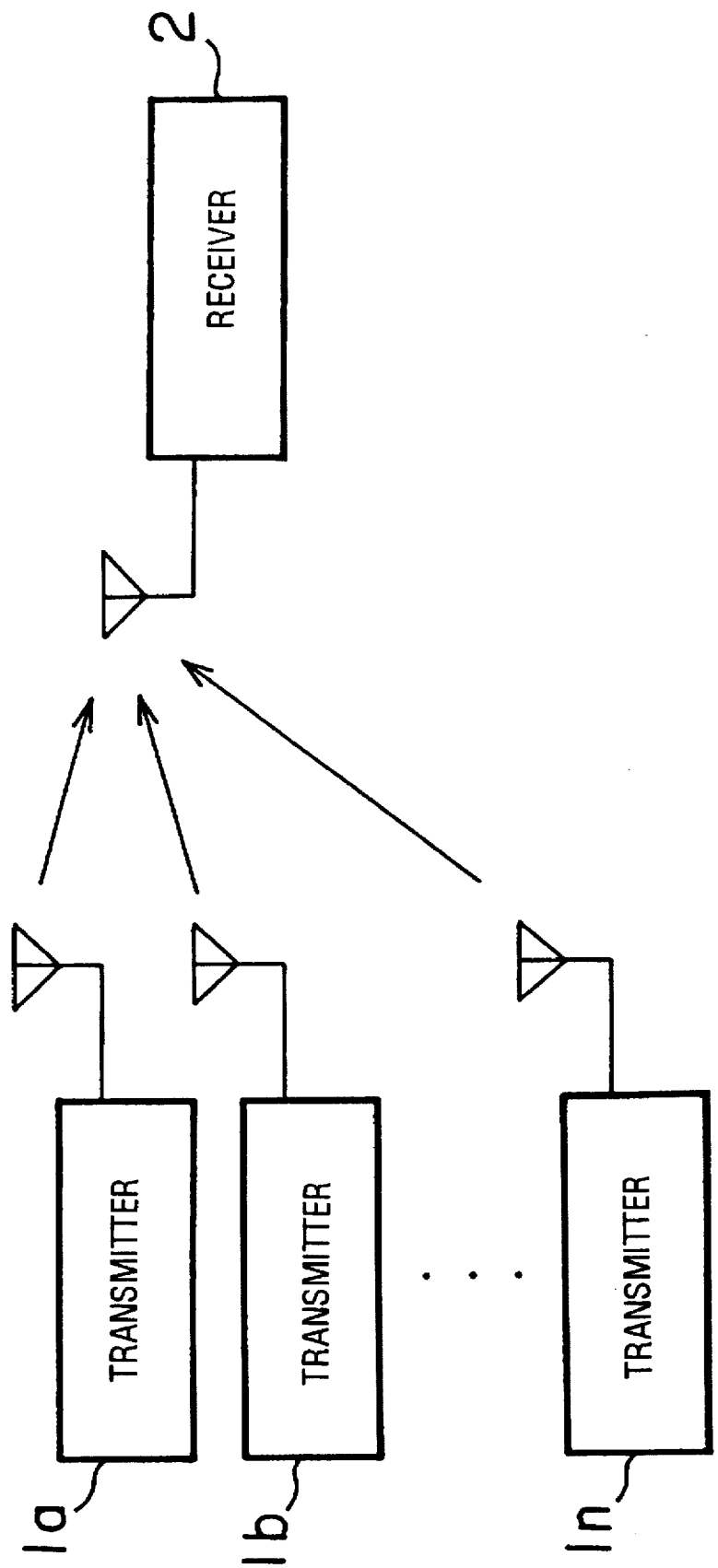
FIG. 1 is a block diagram illustrative of the principles of the present invention.

According to the present invention, as shown in FIG. 1, an apparatus for measuring multipath propagation characteristics generally comprises a plurality of transmitters $1a$–$1n$ located in different spatial positions, respectively, and a receiver 2 for receiving a plurality of waves transmitted from the transmitters $1a$–$1n$ while the receiver 2 is moving.

The transmitters $1a$–$1n$ generate respective waves to be transmitted that each comprise a plurality of discrete spectral components which are arranged in the frequency domain such that they do not overlap each other in the same frequency band. The receiver 2 simultaneously receives the waves which have been transmitted from the respective transmitters $1a$–$1n$ and each propagated over a plurality of different propagation routes or paths while being subjected to multipath fading, and measures multipath propagation characteristics relative to the paths based on the received waves.

If it is assumed that the discrete spectral components of the wave transmitted from the transmitter $1a$ are represented by $f_{1(1)}$–$f_{1(k)}$, the discrete spectral components of the wave transmitted from the transmitter $1b$ are represented by $f_{2(1)}$–$f_{2(k)}$, and the discrete spectral components of the wave transmitted from the transmitter $1n$ are represented by $f_{n(1)}$–$f_{n(k)}$, then when the receiver 2 receives the waves transmitted from the transmitters $1a$–$1n$ and converts the received waves into a spectrum in the frequency domain, the spectrum is composed of spectral components as shown in FIG. 5, for example. Since the spectral components are sufficiently separate from each other in the obtained spectrum, it is possible to analyze the received waves simultaneously.

The spectral components have been propagated over respective different propagation routes or paths and hence subjected to multipath fading in those routes or paths. Therefore, the multipath propagation charac-teristics relative to the propagation paths can be determined by analyzing the spectral components.

An apparatus for measuring multipath propagation characteristics according to a first embodiment of the present invention based on the above principles will first be described below with reference to FIGS. 2 and 3.

Figure 2:
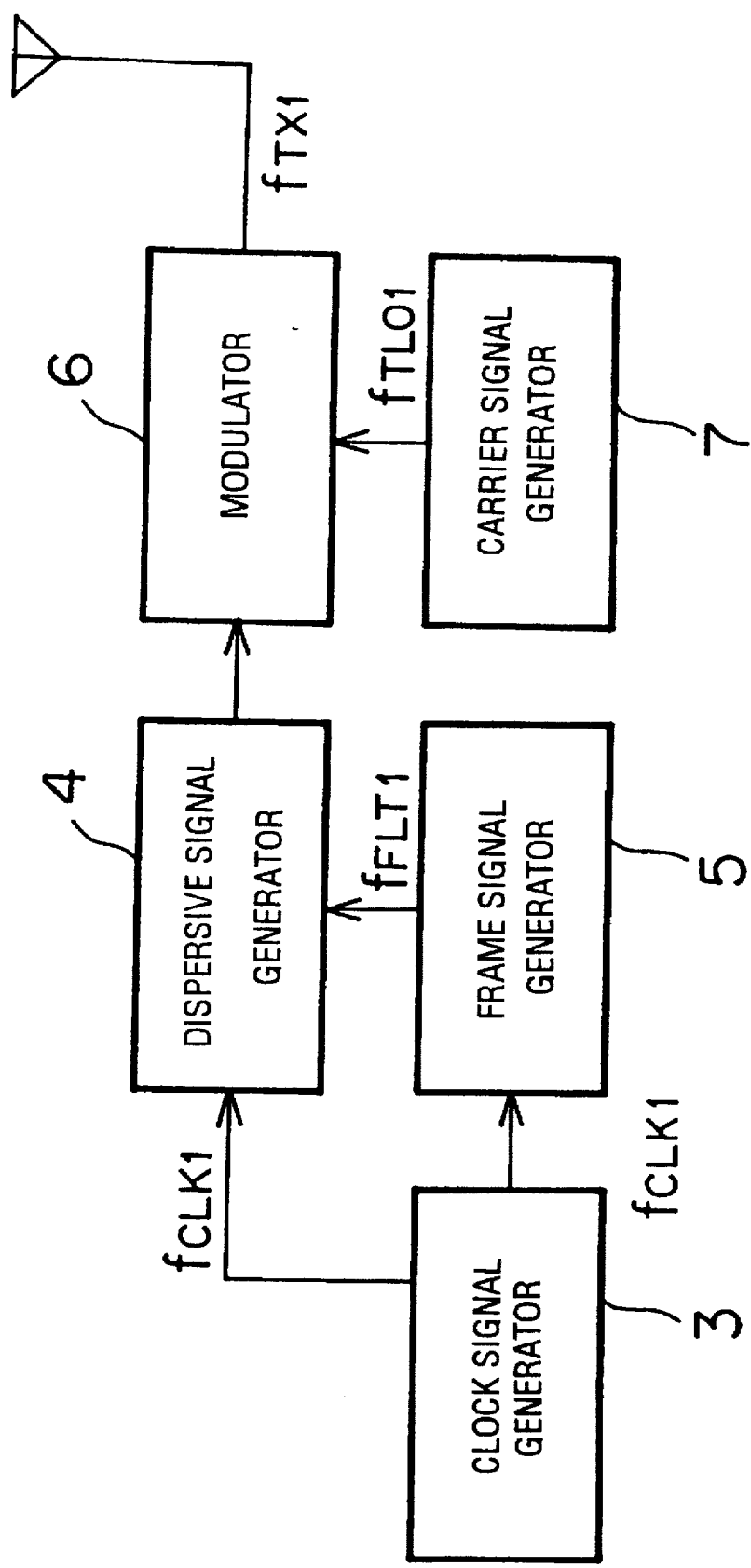
FIG. 2 is a block diagram of a transmitter in an apparatus for measuring multipath propagation characteristics according to a first embodiment of the present invention.
Figure 4A:
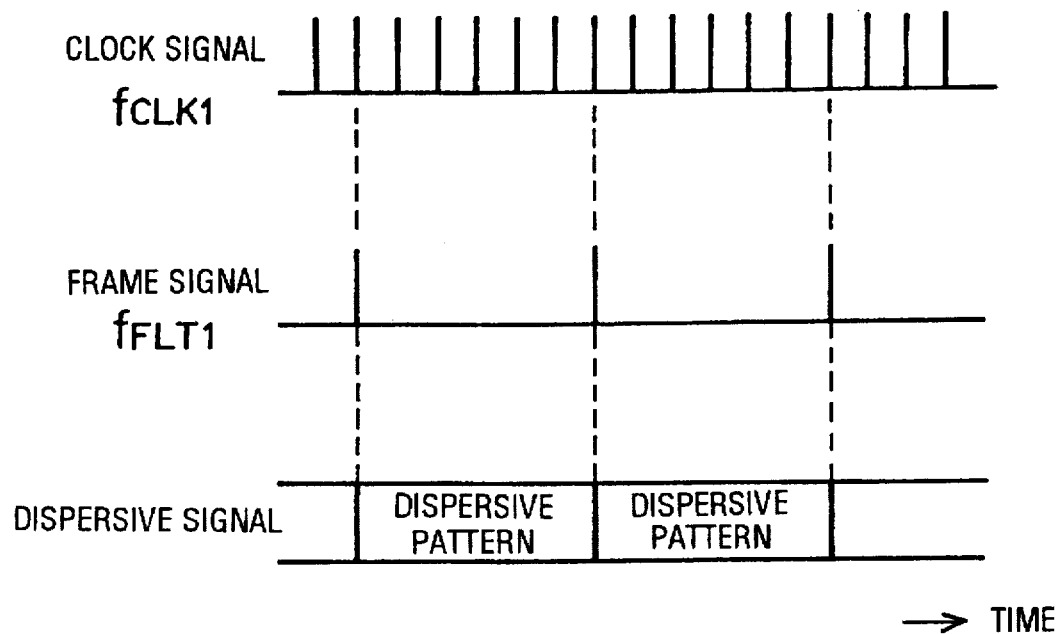
FIG. 4(A) is a diagram of signals in the time domain which are generated in the transmitter.
Figure 4B:
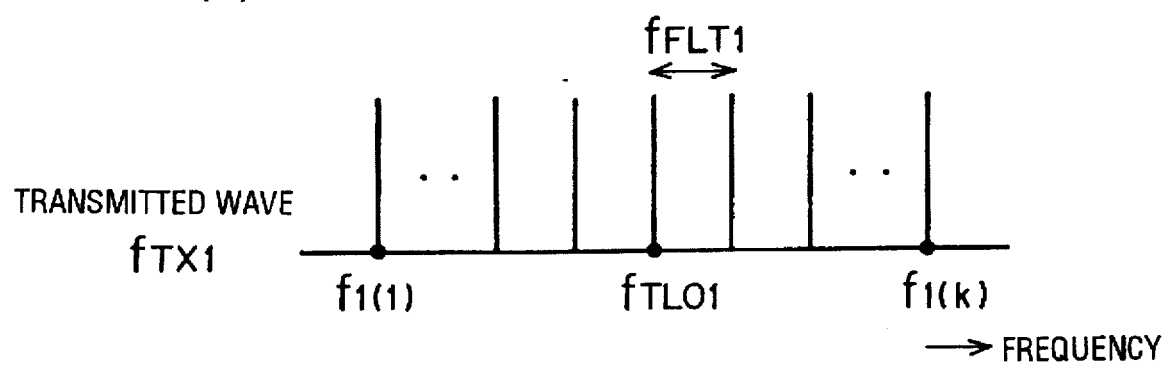
FIG. 4(B) is a diagram of a signal in the frequency domain which is outputted from the transmitter.
Figure 6:
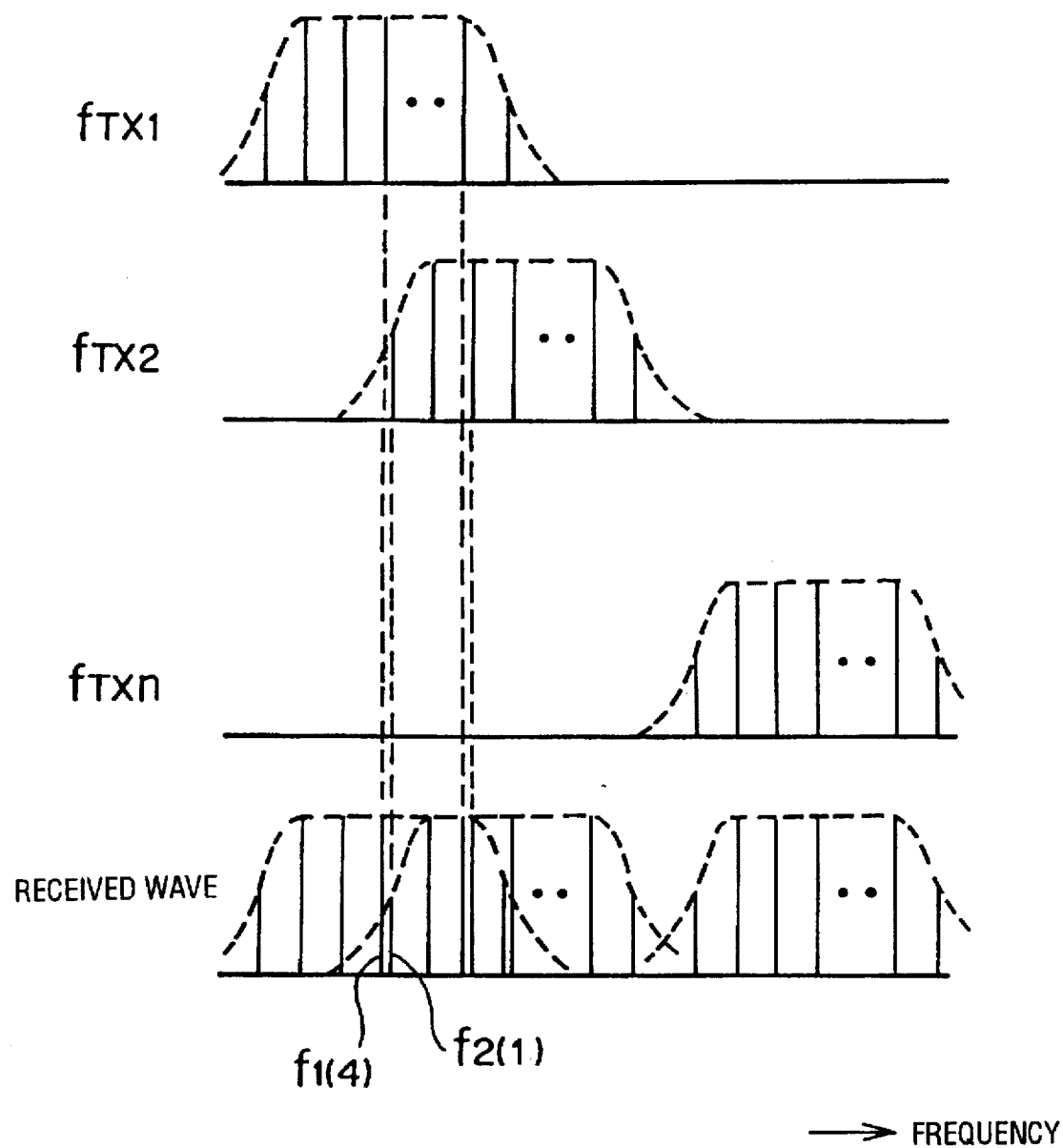
FIG. 6 is a diagram showing another example of a modulated wave.

The transmitters $1a$–$1n$ shown in FIG. 1 are substantially identical in structure to each other, and FIG. 2 shows in block form the transmitter $1a$ by way of example. The transmitter $1a$ shown in FIG. 2 will be described below also with reference to FIGS. 4(A) and 4(B), which show signals in the time domain which are generated in the transmitter $1a$ and a signal in the frequency domain which is outputted from the transmitter $1a$.

As shown in FIG. 2, the transmitter $1a$ has a clock signal generator 3, a dispersive signal generator 4, a frame signal generator 5, a modulator 6, and a carriage signal generator 7. The clock signal generator 3 generates and sends a reference clock signal $f_{CLK1}$ (see FIG. 4(A)) to the dispersive signal generator 4 and the frame signal generator 5. Based on the supplied clock signal $f_{CLK1}$, the frame signal generator 5 generates a frame signal $f_{FLT1}$ (see FIG. 4(A)) each time it is supplied with a predetermined number of clock pulses of the clock signal $f_{CLK1}$. The generated frame signal $f_{FLT1}$ is supplied from the frame signal generator 5 to the dispersive signal generator 4. Based on the clock signal $f_{CLK1}$ and the frame signal $f_{FLT1}$, the dispersive signal generator 4 generates a succession of dispersive patterns (see FIG. 4(A)) each composed of a number of bits each produced at the clock period, the dispersive patterns being repeated at the period of the frame signal $f_{FLT1}$. The dispersive signal generator 4 supplies a dispersive signal representative of the repeated dispersive patterns to the modulator 6 which is supplied with a carrier signal $f_{TLO1}$ from the carrier signal generator 7. The modulator 6 modulates the carrier signal $f_{TLO1}$ with the dispersive signal from the dispersive signal generator 4, and transmits the modulated carriage signal as a transmitted wave $f_{TX1}$ (see FIG. 4(B)) from an antenna. The transmitted wave $f_{TX1}$ has a spectrum having a central frequency $f_{TLO1}$ equal to the frequency of the carrier signal $f_{TLO1}$, and composed of spectral components $f_{1(1)}, f_{1(2)}, \ldots f_{1(k)}$ that are discretely dispersed at frequency intervals $f_{FLT1}$ equal to the frequency of the frame signal $f_{FLT1}$. It should be noted that the expression "carrier signal $f_{TLO1}$" indicates that the carrier signal $f_{TLO1}$ has a frequency $f_{TLO1}$, and similarly the frame signal $f_{FLT1}$ has a frequency $f_{FLT1}$ and the spectral component. $f_{1(1)}$ has a frequency $f_{1(1)}$.

The transmitter $1b$ is structurally identical to the transmitter $1a$. However, the carrier signal generator of the transmitter $1b$ generates a carrier signal $f_{TLO2}$ having a frequency $f_{TLO2}$ which is offset or differs from the frequency $f_{TLO1}$ of the carrier signal $f_{TLO1}$ by $\Delta f = f_{FLT1}/n$ (n is the number of transmitters used). The frame signal generator in the transmitter $1b$ generates a frame signal $f_{FLT2}$ having a frequency $f_{FLT2}$ which is the same as the frequency $f_{FLT1}$ of the frame signal $f_{FLT1}$. Therefore, the transmitter $1b$ transmits a transmitted wave $f_{TX2}$ from its antenna, which has a spectrum having a central frequency $f_{TLO2}$ ($=f_{TLO1}+\Delta f$) and composed of spectral components $f_{2(1)}, f_{2(2)}, \ldots f_{2(k)}$ that are discretely dispersed at frequency intervals $f_{FLT2}$ ($=f_{FLT1}$).

Likewise, the transmitter $1n$ is structurally identical to the transmitter $1a$. However, the carrier signal generator of the transmitter $1n$ generates a carrier signal $f_{TLOn}$ having a frequency $f_{TLOn}$ which is offset or differs from the frequency $f_{TLO(n-1)}$ of an adjacent carrier signal $f_{TLO(n-1)}$ by $\Delta f$. The frame signal generator of the transmitter $1n$ generates a frame signal $f_{FLTn}$ having a frequency $f_{FLTn}$ which is the same as the frequency $f_{FLT1}$ of the frame signal $f_{FLT1}$. That is, the frame signals $f_{FLT1}$, $f_{FLT2}$, ... $f_{FLTn}$ have the same frequency $f_{FLT1}=f_{FLT2}=...=f_{FLTn}$. Therefore, the transmitter $1n$ transmits a transmitted wave $f_{TXn}$ from its antenna, which has a spectrum having a central frequency $f_{TLOn}$ [$=f_{TLO1}+(n-1)\Delta f$] and composed of spectral components $f_{n(1)}, f_{n(2)}, ... f_{n(k)}$ that are discretely dispersed at frequency intervals $f_{FLTn}$ ($=f_{FLT1}$).

When the transmitted waves $f_{TX1}$–$f_{TXn}$ from the respective transmitters $1a$–$1n$ are simultaneously received by the receiver 2, the receiver 2 converts them into a spectrum in the frequency domain, as described later on, the spectrum being composed of spectral components as shown in FIG. 5.

The receiver 2 will be described in detail below with reference to FIG. 3. As shown in FIG. 3, the receiver 2 comprises a receiving unit 8, a time-domain/frequency-domain converter 9, a received wave measuring unit 10, and an analyzer 11. The receiving unit 8 simultaneously receives the transmitted waves $f_{TX1}$–$f_{TXn}$, converts them into IF (intermediate-frequency) signals, and sends the IF signals to the time-domain/frequency-domain converter 9. The time-domain/frequency-domain converter 9 is identical to a complex Fourier transform circuit described in Japanese patent application No. 5-315203. The time-domain/frequency-domain converter 9 converts the IF signals in the time domain into spectrums in the frequency domain, and supplies the spectrums to the received wave measuring unit 10. One of the spectrums produced by the time-domain/frequency-domain converter 9 is shown in FIG. 5. The received wave measuring unit 10 calculates electric power values of the respective transmitted waves $f_{TX1}$–$f_{TXn}$ based on the spectrums. The analyzer 11 makes various analyses of multipath propagation characteristics based on the calculated electric power values.

The transmitters $1a$–$1n$ are located in different spaced positions, respectively, where base stations are planned to be installed, and the receiver 2 which is moving receives transmitted radio waves from the transmitters $1a$–$1n$. Each of the transmitted waves is propagated over different routes or paths where it is subjected to multipath fading, and then reaches the receiver 2. Since the spectral components of the transmitted waves that have been received by the receiver 2 are distinctly separate from each other, it is possible to simultaneously analyze the multipath propagation characteristics relative to the plural propagation path systems. The results of the analysis can be used in efforts to position the base stations in optimal locations.

In the above embodiment, the spectral components of the received waves are arranged as shown in FIG. 5 such that they do not overlap each other in the frequency domain. Inasmuch as it is of most importance that the spectral components do not overlap each other in the frequency domain, the frequency $f_{TLO2}$ of the carrier signal $f_{TLO2}$ in the transmitter $1b$ may not necessarily be offset from the frequency $f_{TLO1}$ of the adjacent carrier signal $f_{TLO1}$ exactly by $\Delta f=f_{FLT1}/n$, and the frequency $f_{FLT2}$ of the frame signal $f_{FLT2}$ in the transmitter $1b$ may not necessarily be exactly the same as the frequency $f_{FLT1}$ of the frame signal $f_{FLT1}$.

Furthermore, insofar as the spectral components do not overlap each other in the frequency domain, the frequency $f_{TLO1}$ of the carrier signal $f_{TLO1}$ and the frequency $f_{TLO2}$ of the carrier signal $f_{TLO2}$ may differ from each other to the extent that the spectral component $f_{2(1)}$ of the transmitted wave $f_{TX2}$ is located in the frequency domain at a position that is spaced $\Delta f$ from the spectral component $f_{1(4)}$ of the transmitted wave $f_{TX1}$.

An apparatus for measuring multipath propagation characteristics according to a second embodiment of the present invention will be described below with reference to FIG. 7.

The apparatus for measuring multipath propagation characteristics according to the second embodiment is basically the same as the apparatus for measuring multipath propagation characteristics according to the first embodiment except for a received wave measuring unit in a receiver. The received wave measuring unit additionally includes a function to remove any spectral components which should not overlap each other, but are caused to overlap each other, in the frequency domain due to frequency instabilities in the transmitters. FIG. 7 shows in block form a circuit arrangement for performing such a function.

Figure 7:
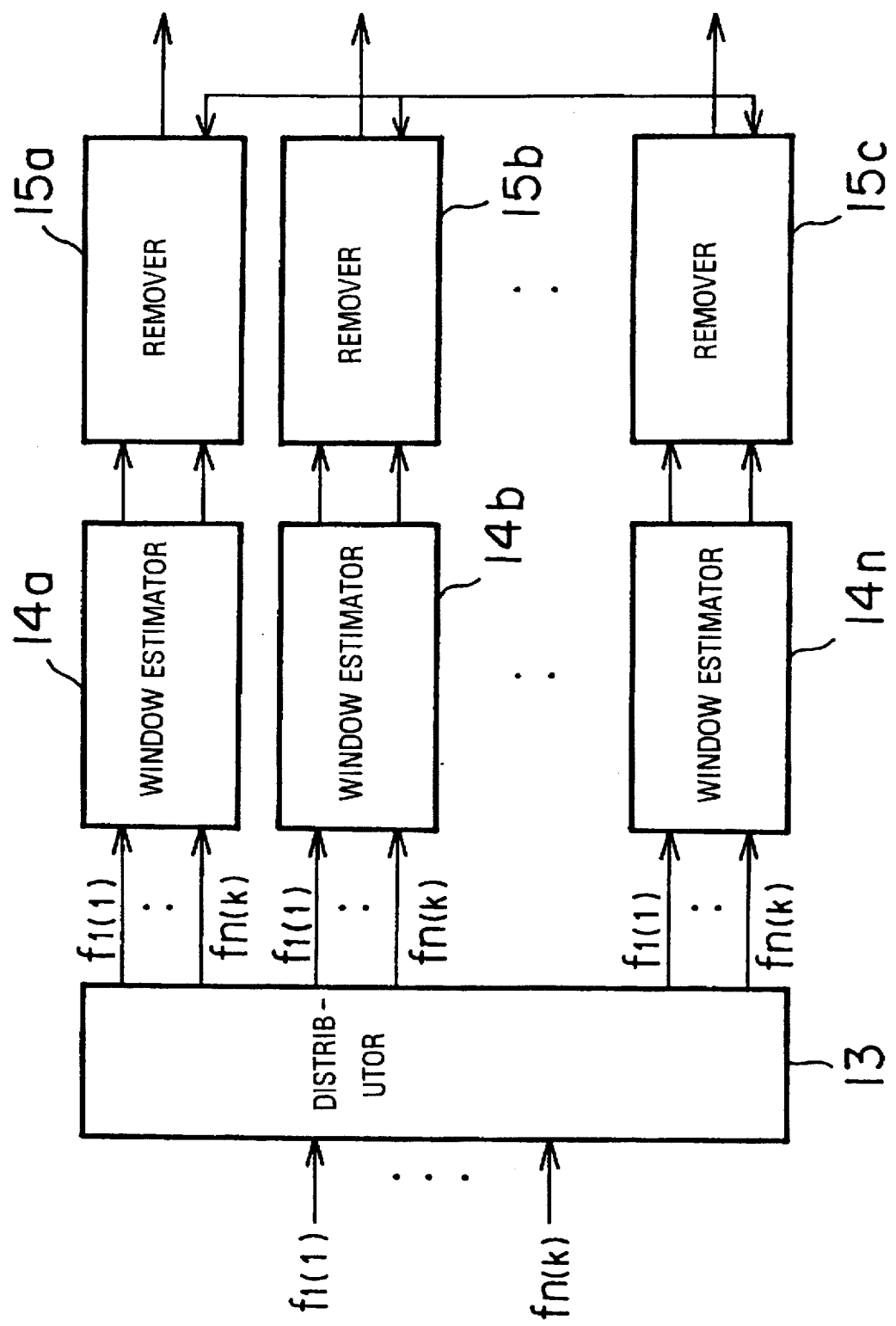
FIG. 7 is a block diagram of a receiver in an apparatus for measuring multipath propagation characteristics according to a second embodiment of the present invention.

As shown in FIG. 7, a distributor 13 is supplied with sets of spectral components $f_{1(1)}$–$f_{1(k)}$, $f_{2(1)}$–$f_{2(k)}$, ... $f_{n(1)}$–$f_{n(k)}$, and distributes them respectively to window predictors $14a$–$14n$, which are associated respectively with transmitted waves $f_{TX1}$–$f_{TXn}$. The window predictor $14a$ establishes windows each having a predetermined frequency interval, at respective locations where the spectral components $f_{1(1)}$–$f_{1(k)}$ of the transmitted wave $f_{TX1}$ are to be generated. Similarly, the window predictor $14b$ establishes windows each having a predetermined frequency interval, at respective locations where the spectral components $f_{2(1)}$–$f_{2(k)}$ of the transmitted wave $f_{TX2}$ are to be generated, and the window predictor $14n$ establishes windows each having a predetermined frequency interval, at respective locations where the spectral components $f_{n(1)}$–$f_{n(k)}$ of the transmitted wave $f_{TXn}$ are to be generated. Because the spectral components $f_{1(1)}$–$f_{n(k)}$ are arranged so as not to overlap each other in the frequency domain, only one spectral component should enter each of the windows.

Removers $15a$–$15n$ ascertains whether there are a plurality of spectral components that have entered each of the windows established by the corresponding window predictors. If there is only one spectral component in each of the windows, then the removers $15a$–$15n$ determines that there is no problem, and outputs the spectral components. If there are a plurality of spectral components in any of the windows, then the removers $15a$–$15n$ determines that it is not justifiable to analyze these spectral components, and removes them from the spectrum. Since the spectral components to be removed from a window are also to be removed from other windows, the removers $15a$–$15n$ refer to each other for confirming those spectral components.

The frequency interval of the windows is determined in view of the resolutions of the received wave measuring unit and the analyzer. Because this allows spectral components to be removed which cannot be identified as belonging to which received waves, the reliability of the analysis can be increased.

An apparatus for measuring multipath propagation characteristics according to a third embodiment of the present invention will be described below with reference to FIG. 8.

The apparatus for measuring multipath propagation characteristics according to the third embodiment is basically the same as the apparatus for measuring multipath propagation characteristics according to the first embodiment. Those parts of the apparatus according to the third embodiment shown in FIG. 8 which are identical to those of the apparatus according to the first embodiment are denoted by identical reference numerals and will not be described in detail below. Only those parts of the apparatus according to the third embodiment which differ from the apparatus according to the first embodiment will be described in detail below.

Figure 8:
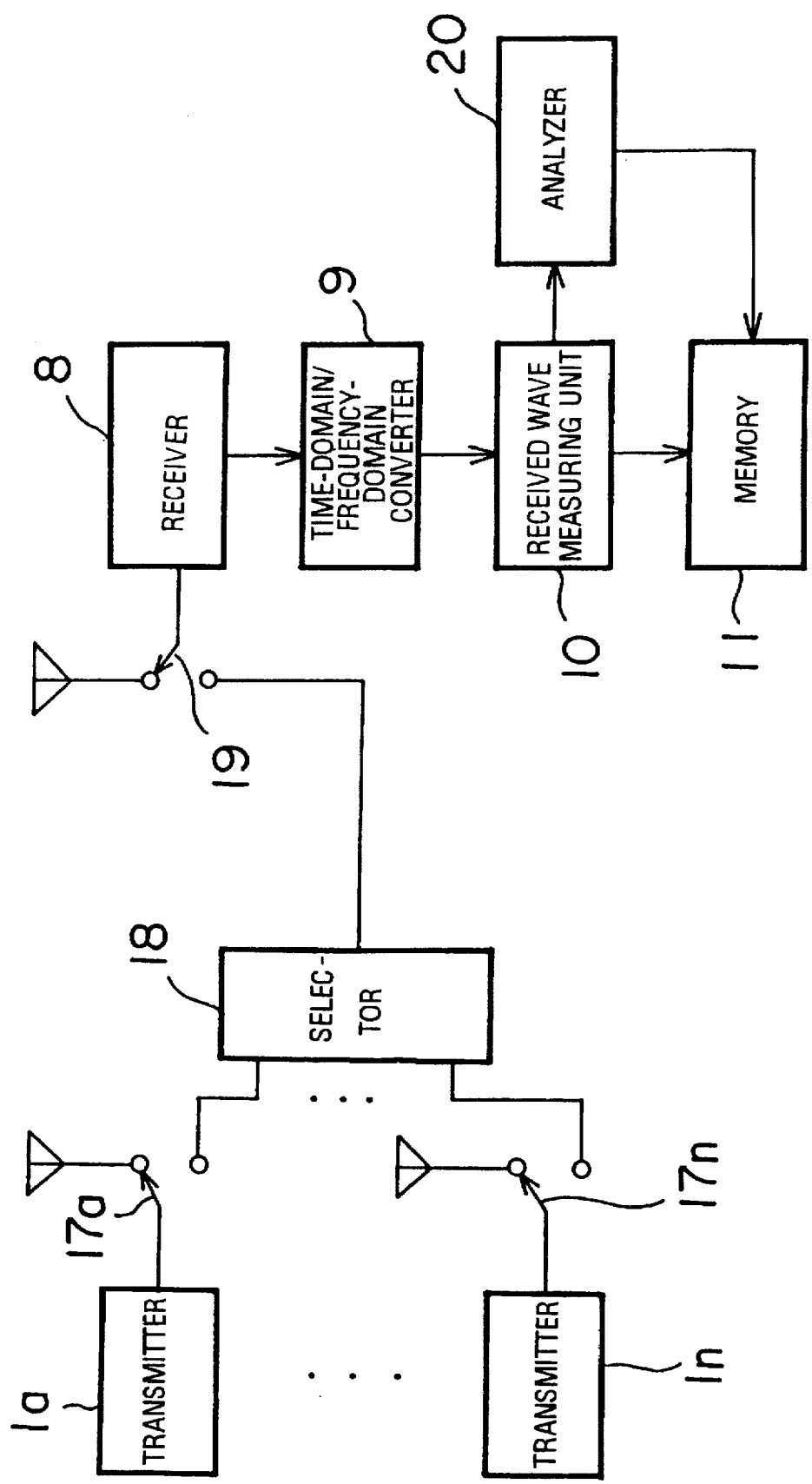
FIG. 8 is a block diagram of an apparatus for measuring multipath propagation characteristics according to a third embodiment of the present invention.

As shown in FIG. 8, selector switches $17a$–$17n$ are connected between respective transmitters $1a$–$1n$ and respective antennas associated therewith, and also connected to a selector 18. A selector switch 19 is connected between a receiver 8 and an antenna associated therewith, and also connected to the selector 18. A memory 20 is connected to a received wave measuring unit 10 and an analyzer 11.

Before starting to measure multipath propagation characteristics, the selector switches $17a$–$17n$, 19 are shifted to positions which are opposite to the illustrated positions, connecting the transmitters $1a$–$1n$ through the selector 18 to the receiver. Therefore, transmitted signals are sent directly to the transmitter not via aerial propagation paths before starting to measure multipath propagation characteristics. This procedure should preferably be carried out with respect to the transmitters $1a$–$1n$ before the transmitters $1a$–$1n$ are actually installed in respective locations where base stations are to be positioned. The selector 18 then selects one, at a time, of the transmitters $1a$–$1n$ and connects it to the receiver. In the receiver, a signal transmitted from the selected transmitter and received by a receiving unit 8 is converted into a spectrum by a time-domain/frequency-domain converter 9. Then, the received wave measuring unit 10 calculates an electric power value of the transmitted wave based on the spectrum. The calculated electric power value is then stored in the memory 20. Therefore, when all the transmitters $1a$–$1n$ have been selected by the selector 18 and the transmitted signals therefrom have been processed as described above, the memory 20 stores electric power values of the transmitted signals that have not been affected by the propagation paths.

Thereafter, the selector switches $17a$–$17n$, 19 are shifted to the illustrated positions, and the transmitters $1a$–$1n$ transmit signals from the corresponding antennas. The transmitted signal are propagated through the propagation paths, received by the antenna of the receiver, and processed by the same normal reception process as with the measuring apparatus according to the first embodiment of the present invention. The analyzer 11 corrects data obtained by the normal reception process with the data stored in the memory 20, thus removing influences posed by the measuring system, and then analyzes the data for multipath propagation characteristics.

Specifically, it is assumed that the electric power values, stored in the memory 20, of the spectral components of the signal transmitted from the transmitter $1a$ are represented respectively by $P_{R1(1)}$, $P_{R1(2)}$, . . . $P_{R1(k)}$, the electric power values, stored in the memory 20, of the spectral components of the signal transmitted from the transmitter $1b$ are represented respectively by $P_{R2(1)}$, $P_{R2(2)}$, . . . $P_{R2(k)}$, and the electric power values, stored in the memory 20, of the spectral components of the signal transmitted from the transmitter $1n$ are represented respectively by $P_{Rn(1)}$, $P_{Rn(2)}$, . . . $P_{Rn(k)}$, and that the electric power values, produced by the normal reception process, of the spectral components of the signal transmitted from the transmitter $1a$ are represented respectively by $P_{1(1)}$, $P_{1(2)}$, . . . $P_{1(k)}$, the electric power values, produced by the normal reception process, of the spectral components of the signal transmitted from the transmitter $1b$ are represented respectively by $P_{2(1)}$, $P_{2(2)}$, . . . $P_{2(k)}$, and the electric power values, produced by the normal reception process, of the spectral components of the signal transmitted from the transmitter $1n$ are represented respectively by $P_{n(1)}$, $P_{n(2)}$, . . . $P_{n(k)}$. Then, the corrected electric power value $P_{1(1)}$ is represented by $P_{1(1)}/P_{R1(1)}$, the corrected electric power value $P_{1(2)}$ by $P_{1(2)}/P_{R1(2)}$, the corrected electric power value $P_{1(k)}$ by $P_{1(k)}/P_{R1(k)}$, the corrected electric power value $P_{2(1)}$ by $P_{2(1)}/P_{R2(1)}$, the corrected electric power value $P_{2(k)}$ by $P_{2(k)}/P_{R2(k)}$, the corrected electric power value $P_{n(1)}$ by $P_{n(1)}/P_{Rn(1)}$, and the corrected electric power value $P_{n(k)}$ by $P_{n(k)}/P_{R2(k)}$.

In this manner, multipath propagation characteristics can be measured with high accuracy.

In the third embodiment, the selector 18 selects one, at a time, of the transmitters $1a$–$1n$ and connects it to the receiver before starting to measure multipath propagation characteristics. Instead, however, a combiner may be inserted in place of the selector 18, and transmitted signals from the transmitters $1a$–$1n$ may be combined by the combiner and sent directly to the receiver not via aerial propagation paths before starting to measure multipath propagation characteristics.

In each of the transmitters $1a$–$1n$ in the apparatus according to the third embodiment, the clock signal generator and the carrier signal generator may comprise highly stable oscillators for increasing the stability of the frequencies of the transmitted signals.

An apparatus for measuring multipath propagation characteristics according to a fourth embodiment of the present invention will be described below with reference to FIG. 9.

Figure 9:
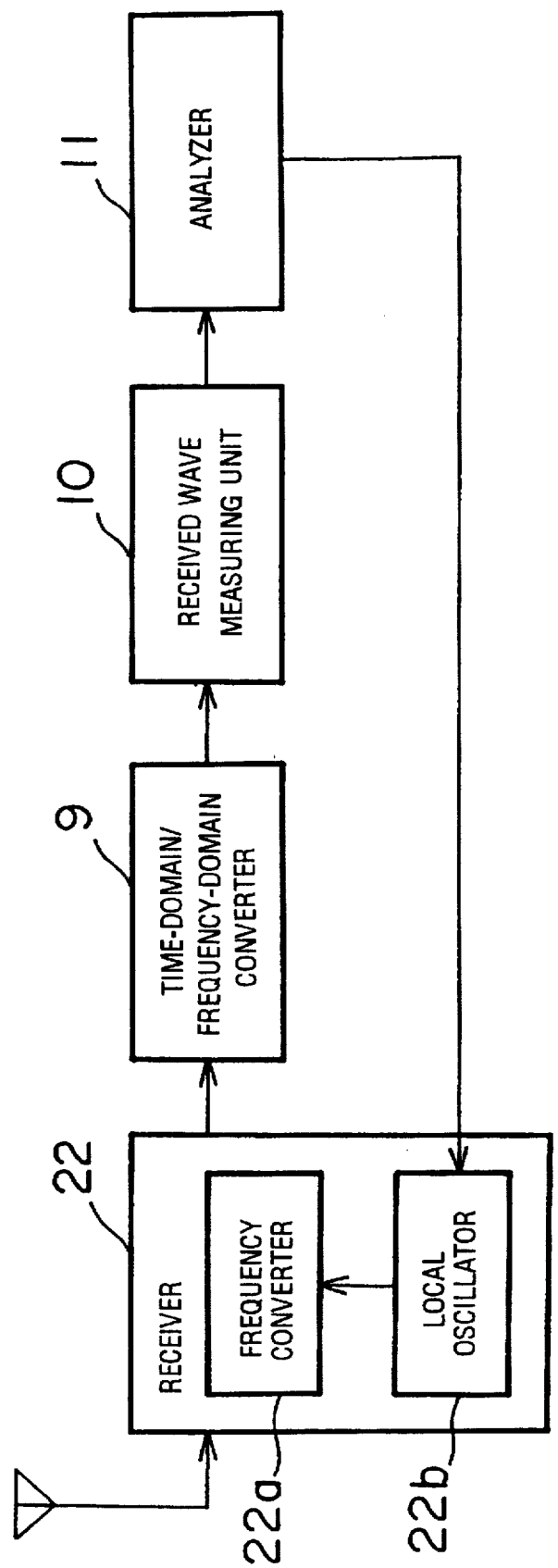
FIG. 9 is a block diagram of a receiver in an apparatus for measuring multipath propagation characteristics according to a fourth embodiment of the present invention.

FIG. 9 shows in block form a receiver in the apparatus for measuring multipath propagation characteristics according to the fourth embodiment. The apparatus according to the fourth embodiment has a plurality of transmitters which are identical to those of the apparatus according to the first embodiment. The receiver in the apparatus for measuring multipath propagation characteristics according to the fourth embodiment is basically the same as the receiver in the apparatus for measuring multipath propagation characteristics according to the first embodiment. Those parts of the apparatus according to the fourth embodiment shown in FIG. 9 which are identical to those of the apparatus according to the first embodiment are denoted by identical reference numerals and will not be described in detail below. Only those parts of the apparatus according to the fourth embodiment which differ from the apparatus according to the first embodiment will be described in detail below.

According to the fourth embodiment, the receiver has a receiving unit 22, a time-domain/frequency-domain converter 9, a received wave measuring unit 10, and an analyzer 11. The receiving unit 22 comprises a frequency converter $22a$ and a local oscillator $22b$ capable of generating a plurality of local oscillation signals having respective different frequencies. The frequency to be generated by the local oscillator $22b$ is controlled by the analyzer 11. The frequency converter $22a$ converts each transmitted wave received by another element of the receiving unit 22 into an IF signal by mixing the transmitted wave with a local oscillation signal that is generated by the local oscillator $22b$. The frequency band of the receiving unit 22 for receiving transmitted signals is selected to be narrower than the frequency bands of the transmitted signals from the transmitters, and the local oscillator $22b$ is controlled to generate the local oscillation signals successively for thereby receiving all the frequency bands of the transmitted signals.

The circuit arrangement according to the fourth embodiment makes it possible to measure multipath propagation characteristics in a wide frequency band.

An apparatus for measuring multipath propagation characteristics according to a fifth embodiment of the present invention will be described below with reference to FIG. 10.

Figure 10:
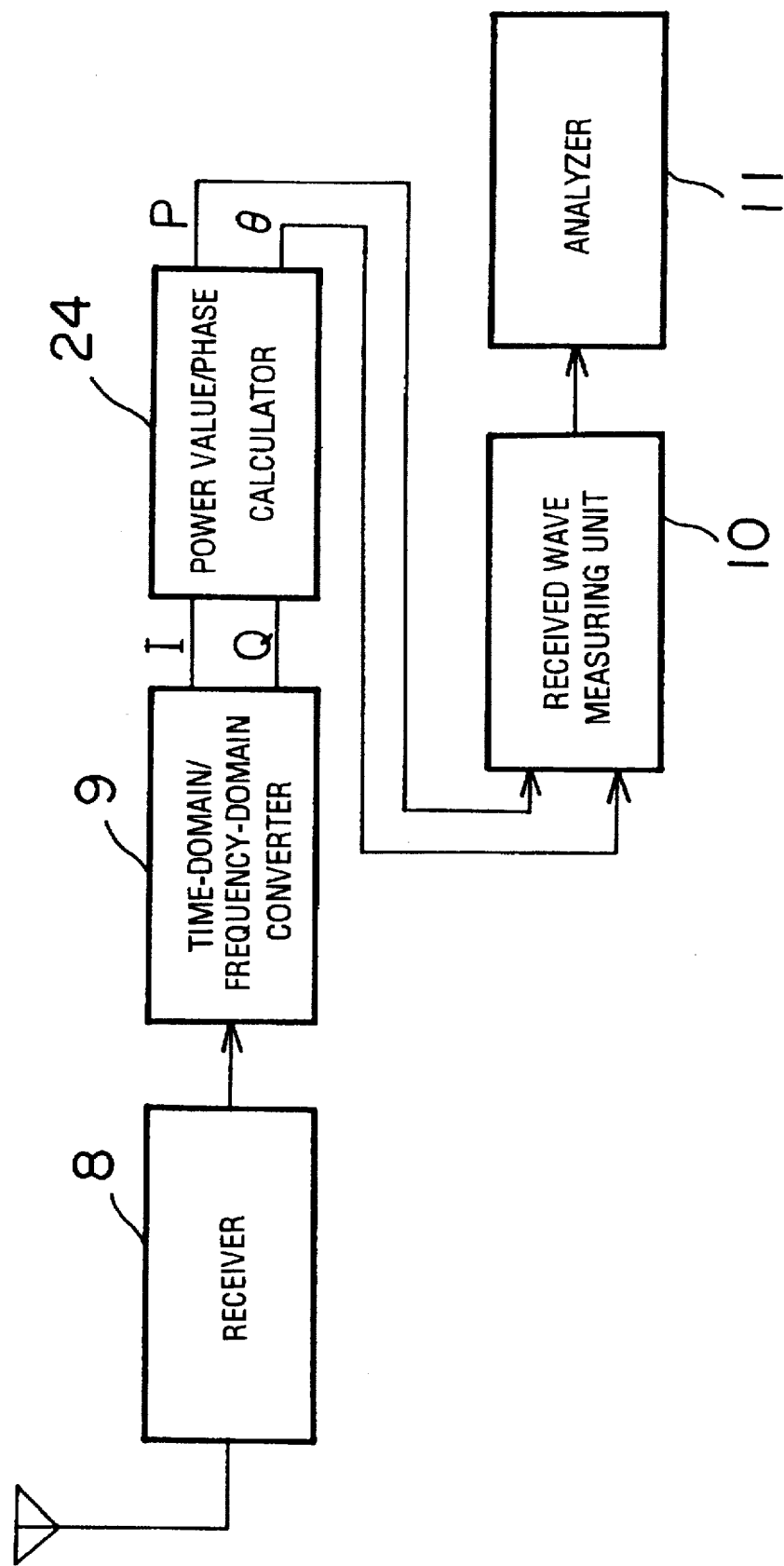
FIG. 10 is a block diagram of a receiver in an apparatus for measuring multipath propagation characteristics according to a fifth embodiment of the present invention.

FIG. 10 shows in block form a receiver in the apparatus for measuring multipath propagation characteristics according to the fifth embodiment. The apparatus according to the fifth embodiment has a plurality of transmitters which are identical to those of the apparatus according to the first embodiment. The receiver in the apparatus for measuring multipath propagation characteristics according to the fifth embodiment is basically the same as the receiver in the apparatus for measuring multipath propagation characteristics according to the first embodiment. Those parts of the apparatus according to the fifth embodiment shown in FIG. 10 which are identical to those of the apparatus according to the first embodiment are denoted by identical reference numerals and will not be described in detail below. Only those parts of the apparatus according to the fifth embodiment which differ from the apparatus according to the first embodiment will be described in detail below.

According to the fifth embodiment, the receiver has a receiving unit 8, a time-domain/frequency-domain converter 9, a power value/phase calculator 24, a received wave measuring unit 10, and an analyzer 11. The power value/phase calculator 24 is connected between the time-domain/frequency-domain converter 9 and the received wave measuring unit 10. The power value/phase calculator 24 is supplied with I- and Q-channel signals from the time-domain/frequency-domain converter 9, calculates electric power values P and phases θ based on the supplied I- and Q-channel signals, and sends the calculated electric power values P and phases θ to the received wave measuring unit 10. The analyzer 11 analyzes multipath propagation characteristics based on the phases as well as the electric power values.

An apparatus for measuring multipath propagation characteristics according to a sixth embodiment of the present invention will be described below with reference to FIG. 11.

Figure 11:
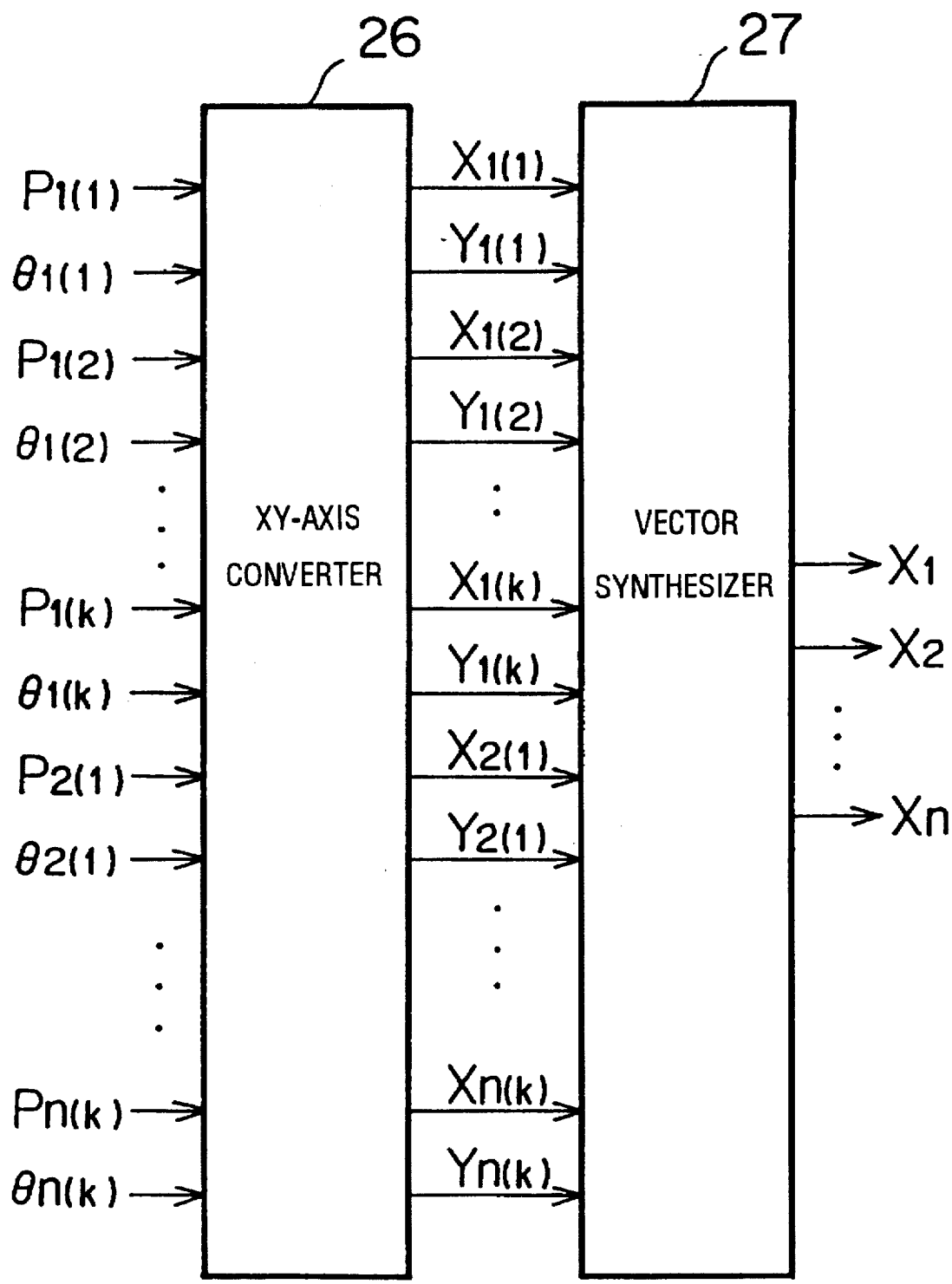
FIG. 11 is a block diagram of an analyzer in a receiver in an apparatus for measuring multipath propagation characteristics according to a sixth embodiment of the present invention.

FIG. 11 shows in block form an analyzer in a receiver in the apparatus for measuring multipath propagation characteristics according to the sixth embodiment. The apparatus according to the sixth embodiment has a plurality of transmitters which are identical to those of the apparatus according to the first embodiment. The receiver in the apparatus for measuring multipath propagation characteristics according to the sixth embodiment is basically the same as the receiver in the apparatus for measuring multipath propagation charac-teristics according to the fifth embodiment except that the analyzer comprises an XY-axis converter 26 and a vector synthesizer 27, as shown in FIG.

As shown in FIG. 11, the XY-axis converter 26 is supplied with electric power values $P_{1(1)}$–$P_{1(k)}$ and phases $\theta_{1(1)}$–$\theta_{1(k)}$ of the spectral components of the signal transmitted from the transmitter 1a, electric power values $P_{2(1)}$–$P_{2(k)}$ and phases $\theta_{2(1)}$–$\theta_{2(k)}$ of the spectral components of the signal transmitted from the transmitter 1b, and electric power values $P_{n(1)}$–$P_{n(k)}$ and phases $\theta_{n(1)}$–$\theta_{n(k)}$ of the spectral components of the signal transmitted from the transmitter 1n. The XY-axis converter 26 converts them into X- and Y-axis values $X_{1(1)}$–$X_{n(k)}$ and $Y_{1(1)}$–$Y_{n(k)}$, and sends the X- and Y-axis values $X_{1(1)}$–$X_{n(k)}$ and $Y_{1(1)}$–$Y_{n(k)}$ to the vector synthesizer 27.

Figure 12:
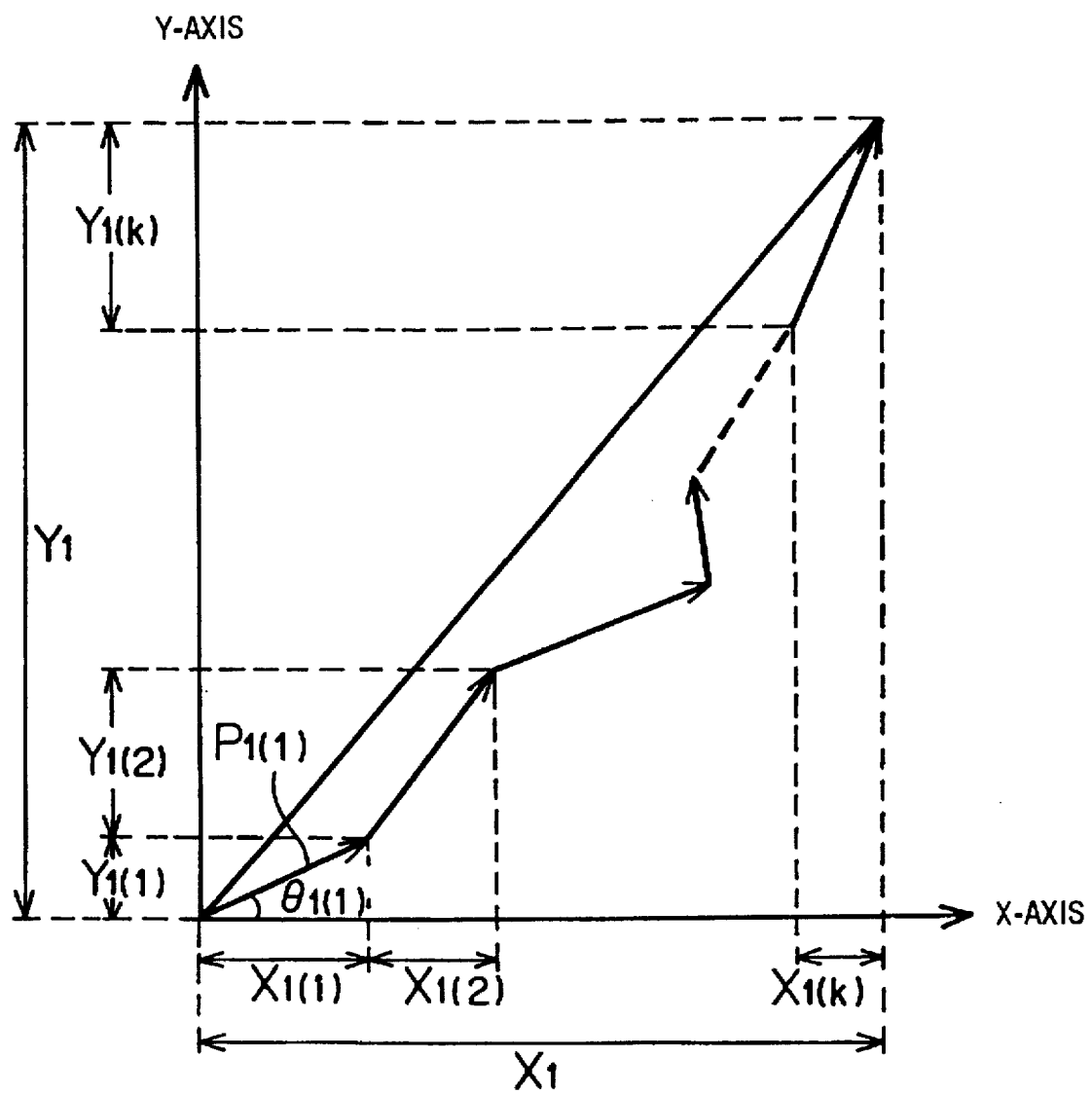
FIG. 12 is a diagram illustrating a synthesis of vectors.

As shown in FIG. 12, the vector synthesizer 27 synthesizes a vector from the spectral components of each transmitted wave. Specifically, a synthesized vector of the transmitted wave from the transmitter 1a has an X-axis value $X_1=(X_{1(1)}+X_{1(2)}+\ldots X_{1(k)})$ and a Y-axis value $Y_1=(Y_{1(1)}+Y_{1(2)}+\ldots Y_{1(k)})$, and similarly a synthesized vector of the transmitted wave from the transmitter 1n has an X-axis value $X_n=(X_{n(1)}+X_{n(2)}+\ldots X_{n(k)})$ and a Y-axis value $Y_n=(Y_{n(1)}+Y_{n(2)}+\ldots Y_{n(k)})$.

Based on the X- and Y-axis values of the synthesized vectors, thus obtained, of the transmitted waves, the analyzer determines carrier phase rotation characteristics of the received waves.

In the sixth embodiment, the spectrums converted by the time-domain/frequency-domain converter may be corrected for a processing time required by the time-domain/frequency-domain converter. Specifically, a corrective value $\Delta\theta$ is expressed by the following equation (1):

$$\Delta\theta = \Delta t \cdot f \tag{1}$$

where f is the frequency of the signal and Δt the measuring interval, and the time difference of frequency conversion may be corrected based on the corrective value Δθ.

Vectors may be synthesized a plurality of times by the vector synthesizer 27 for reducing noise-induced effects and smoothing the spectrum.

An apparatus for measuring multipath propagation characteristics according to a seventh embodiment of the present invention will be described below.

The apparatus for measuring multipath propagation characteristics according to the seventh embodiment is basically the same as the apparatus for measuring multipath propagation characteristics according to the fifth embodiment except that a memory is connected to the analyzer for storing electric power values in the frequency domain of transmitted waves and a corrective value for phases.

A process of calculating a corrective value for phases will be described below.

If it is assumed that electric power values and phases of the spectrums of transmitted waves are represented by $(P_{R1}, \theta_{R1})$, $(P_{R2}, \theta_{R2})$, ... $(P_{Rn}, \theta_{Rn})$, respectively, then phase differences are given as follows:

$$\Delta\theta_{R1,2} = \theta_{R1} - \theta_{R2} \tag{2a}$$

$$\Delta\theta_{R2,3} = \theta_{R2} - \theta_{R3} \tag{2b}$$

...

$$\Delta\theta_{R(n-1),n} = \theta_{R(n-1)} - \theta_{Rn} \tag{2n}$$

Therefore, an average $\Delta\theta_m$ of these phase differences is expressed by:

$$\Delta\theta_m = [\Sigma(\Delta\theta_{R(i-1),i})/n], \; (i=2-n) \tag{3}$$

Using the above phase differences and the average thereof, a corrective value $\delta\theta_r$ for phases is calculated according to the following equation (4):

$$\delta\theta_r = (\Delta\theta_{R(r-1),r} + \Delta\theta_{Rr,(r+1)})/2 - \Delta\theta_m \tag{4}$$

The calculated corrective value $\delta\theta_r$ for phases is stored in the memory connected to the analyzer.

The average $\Delta\theta_m$ may be zero as it is a constant part.

The receiver measures electric power values and phases of the spectrums of the received waves in the same manner as with the receiver in the measuring apparatus according to the fifth embodiment. If the measured electric power values and phases of the spectrums of transmitted waves are represented by $(P_1, \theta_1)$, $(P_2, \theta_2)$, ... $(P_n, \theta_n)$, respectively, then the analyzer corrects the phases using the corrective value stored in the memory. Specifically, the phase differences between the measured phases are corrected into $\Delta\theta_{j,(j+1)}$ according to the equation (5) given below.

$$\Delta\theta_{j,(j+1)} = \theta_j - \theta_{(j+1)} - (\delta\theta_j + \delta\theta_{(j+1)})/2 \tag{5}$$

The above correction is effective in removing influences posed by the measuring system, and correcting for the differences between times for measuring the spectrums. The analyzer then determines multipath propagation characteristics using the above data.

An apparatus for measuring multipath propagation characteristics according to an eighth embodiment of the present invention will be described below.

The apparatus for measuring multipath propagation characteristics according to the eighth embodiment is basically the same as the apparatus for measuring multipath propagation characteristics according to the first embodiment except that the analyzer determines a self frequency correlation based on the electric power values corresponding to the spectrums of the received waves.

Specifically, if it is assumed that electric power values of the received spectrum of each transmitted wave i (i=1–n) are represented respectively by $P_{i(1)}, P_{i(2)}, \ldots P_{i(k)}$, then a self frequency correlation $\eta(\Delta d)$ is determined according to the following equation (6):

$$\eta(\Delta d) = \frac{\sum_{d=1}^{k} P_i(d) P_i(d+\Delta d)}{\sum_{d=1}^{k} P_i(d) P_i(d)} \quad (6)$$

where $\Delta d$ represents a frequency interval at which to take a correlation.

In this manner, it is possible to simultaneously determine self frequency correlations of a number of propagation paths in the same frequency band.

An apparatus for measuring multipath propagation characteristics according to a ninth embodiment of the present invention will be described below.

The apparatus for measuring multipath propagation characteristics according to the ninth embodiment is basically the same as the apparatus for measuring multipath propagation characteristics according to the first embodiment except that the analyzer determines a transfer function based on the electric power values and phases corresponding to the spectrums of the received waves.

Specifically, amplitude frequency characteristics are determined using the Lagrange's formula according to the following equation (7):

$$G_h(f) = g_1(f) P_{h(1)}(f) + g_2(f) P_{h(2)}(f) + \ldots + g_k(f) P_{h(k)}(f) \quad (h=1-n) \quad (7)$$

where f is the frequency in the transmission band, and $g_{1(f)} - g_{k(f)}$ are expressed by the following equation (8):

$$g_i(f) = [(f-f_1) \ldots (f-f_{i-1})(f-f_{i+1}) \ldots f-f_k]/[(f_i-f_1) \ldots (f_i-f_{i-1})(f_i-f_{i+1}) \ldots (f_i-f_k)] \quad (8)$$

Phase characteristics are expressed as the difference between adjacent phases and determined according to the following equations (9a), (9b):

$$\Delta \theta_i = [(\theta_{i-1} - \theta_i) + (\theta_i - \theta_{i+1})]/2 \quad (9a)$$

$$D_h(f) = d_1(f)\Delta\theta_{h(1)} + d_2(f)\Delta\theta_{h(2)} + \ldots d_k(f)\Delta\theta_{h(k)} \quad (h=1-n) \quad (9b)$$

where $d(f)-d_k(f)$ are expressed by the following equation (10):

$$d_i(f) = [(f-f_1) \ldots (f-f_{i-1})(f-f_{i+1}) \ldots f-f_k]/[(f_i-f_1) \ldots (f_i-f_{i-1})(f_i-f_{i+1}) \ldots (f_i-f_k)] \quad (10)$$

In this manner, it is possible to simultaneously determine transfer functions of a number of propagation paths in the same frequency band.

An apparatus for measuring multipath propagation characteristics according to a tenth embodiment of the present invention will be described below with reference to FIG. 13.

Figure 13:
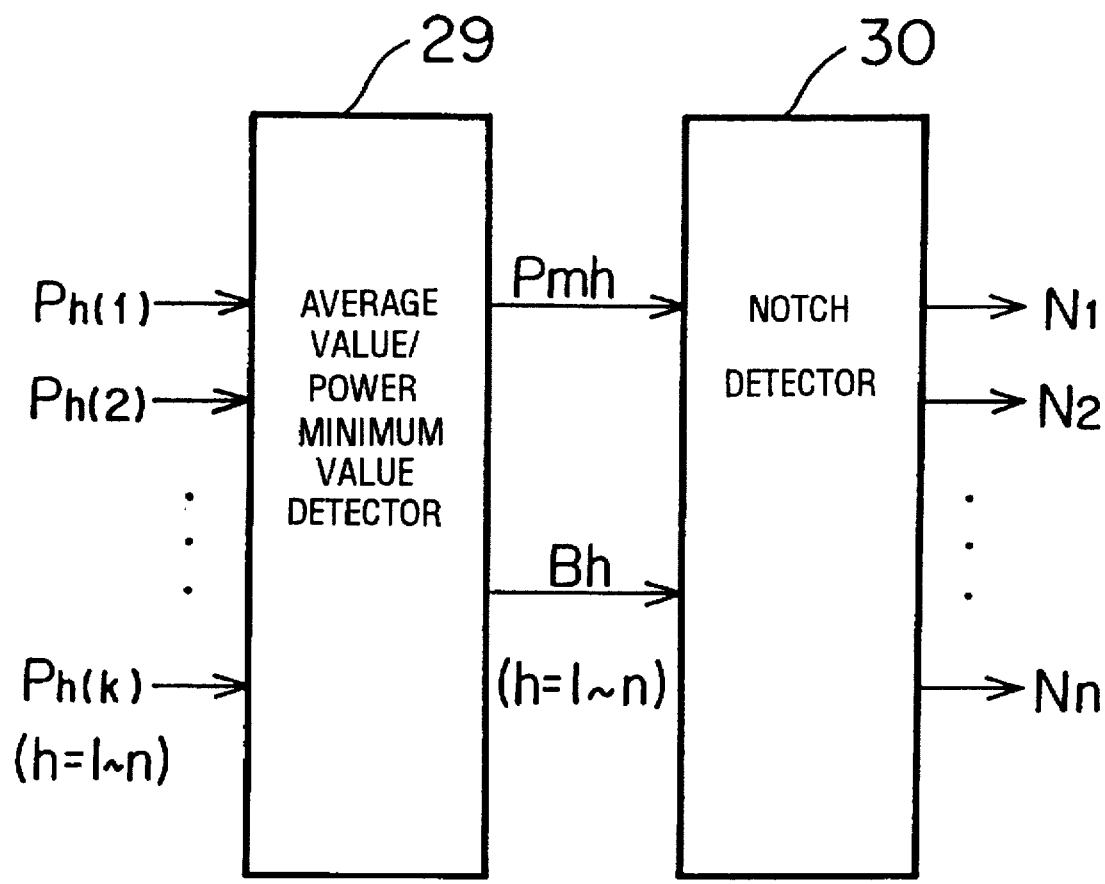
FIG. 13 is a block diagram of an analyzer in a receiver in an apparatus for measuring multipath propagation characteristics according to a tenth embodiment of the present invention.

FIG. 13 shows in block form an analyzer in a receiver in the apparatus for measuring multipath propagation characteristics according to the tenth embodiment. The apparatus according to the tenth embodiment is basically the same as the apparatus according to the first embodiment except that the analyzer comprises an average value/power minimum value detector 29 and a notch detector 30.

The average value/power minimum value detector 29 is supplied with electric power values $P_{h(1)}-P_{h(k)}$ of the received waves (h=1–n). Actually, the average value/power minimum value detector 29 is supplied with electric power values $P_{1(1)}, P_{1(2)}, \ldots P_{1(k)}, P_{2(1)}, P_{2(2)}, \ldots P_{2(k)}, P_{n(1)}, P_{n(2)}, \ldots P_{n(k)}$ corresponding to the transmitted waves. Based on the supplied electric power values, the average value/power minimum value detector 29 calculates their average value $P_{mh}$ (h=1–n) according to the following equation (11):

$$P_{mh} = [\Sigma P_{h(k)}]/k \quad (k=1-k) \quad (11)$$

The average value/power minimum value detector 29 also calculates a power minimum value $B_h$ (h=1–n) according to the following equation (12):

$$B_h = Min(P_{h(i)}), \quad (i=1-k) \quad (12)$$

where $Min(P_{h(i)})$ represents the value of $P_{h(i)}$ which satisfies the inequalities: $P_{h(i)} < P_{h(i-1)}, P_{h(i)} < P_{h(i+1)}$ at i=1–k.

Based on the average value $P_{mh}$ and the power minimum value $B_h$, the notch detector 30 detects a notch $N_h$ (h=1–n).

Specifically, the notch detector 30 detects a power minimum value $B_h$ which satisfies both the condition that the power minimum value $B_h$ is smaller than the average value $P_{mh}$ and the condition that there are differences of a prescribed value or greater between the power minimum value $B_h$ and maximum values on both sides thereof, and outputs the detected power minimum value $B_h$ as a notch $N_h$.

According to the tenth embodiment, therefore, an amplitude notch distribution in the transmission band of a number of propagation paths can simultaneously be determined in the same transmission band.

An apparatus for measuring multipath propagation characteristics according to an eleventh embodiment of the present invention will be described below with reference to FIG. 14.

Figure 14:
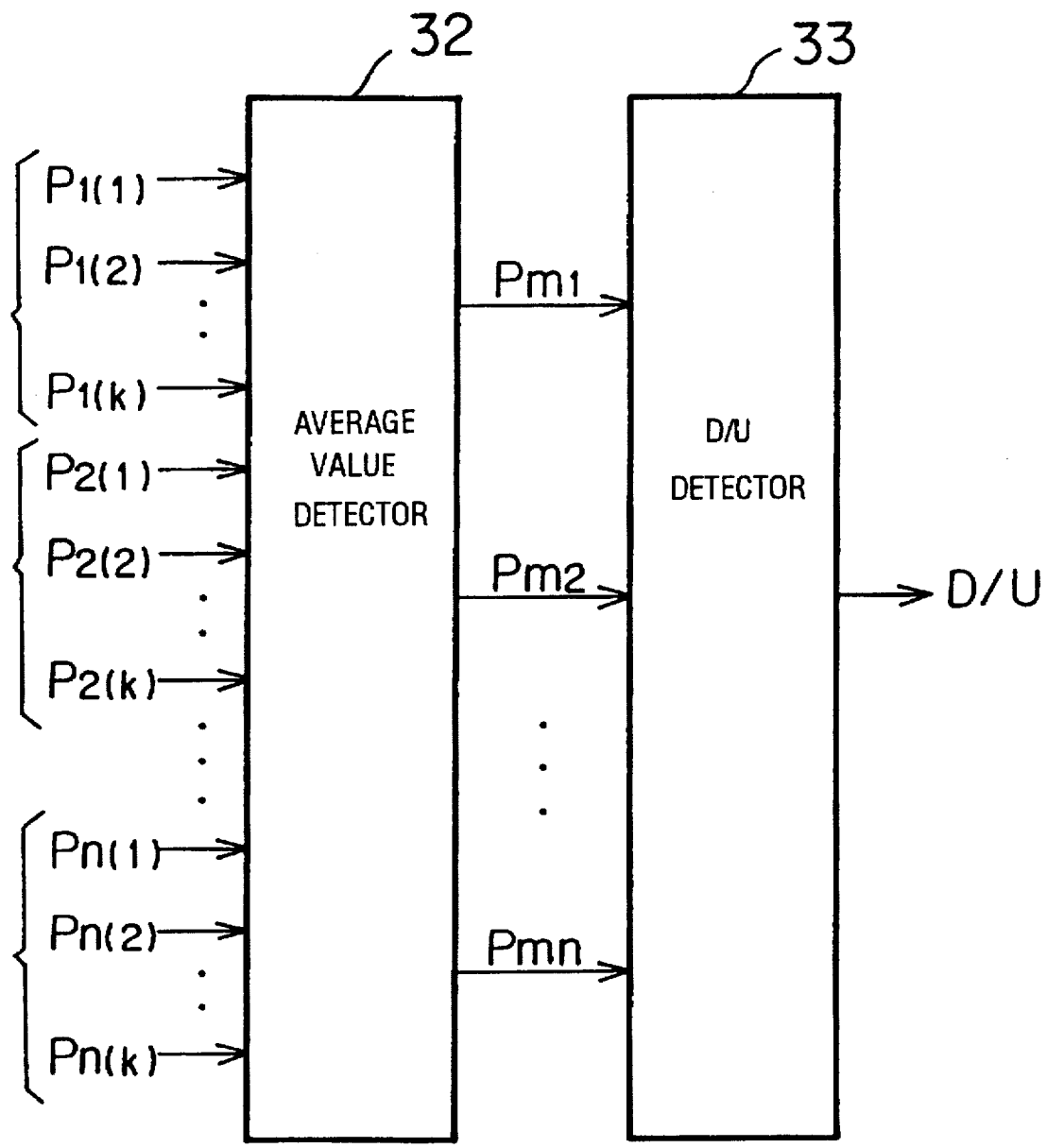
FIG. 14 is a block diagram of an analyzer in a receiver in an apparatus for measuring multipath propagation characteristics according to an eleventh embodiment of the present invention.

FIG. 14 shows in block form an analyzer in a receiver in the apparatus for measuring multipath propagation characteristics according to the eleventh embodiment. The apparatus according to the eleventh embodiment is basically the same as the apparatus according to the first embodiment except that the analyzer comprises an average value detector 32 and a D/U detector 33.

The average value detector 32 is supplied with electric power values $P_{h(1)}-P_{h(k)}$ of the received waves (h=1–n). Based on the supplied electric power values $P_{h(1)}-P_{h(k)}$, the average value detector 32 calculates their average value $P_{mh}$, and sends the calculated average value $P_{mh}$ to the D/U detector 33.

Using the supplied average value $P_{mh}$, the D/U detector 33 calculates a signal-power-to-disturbing-power ratio D/U at the time one of the transmitted waves is selected as a wave to be received.

For example, if the wave transmitted from the transmitter 1b is selected to be a wave to be received, then all the waves transmitted from the other transmitters are regarded as disturbing waves, and the signal-power-to-disturbing-power ratio D/U is calculated according to the following equation (13):

$$D/U = P_{m2}/(P_{m1}+P_{m3}+P_{m4}+\ldots+P_{mn}) \tag{13}$$

If a noise power produced in the receiver is represented by N, then a signal-power-to-noise-power ratio C/N is expressed by $P_{m2}/N$. Using the signal-power-to-noise-power ratio C/N, a ratio D/(N+U) is calculated according to the following equation (14):

$$D/(N+U) = 1/[1/(D/U)+1/(C/N)] \tag{14}$$

An apparatus for measuring multipath propagation characteristics according to a twelfth embodiment of the present invention will be described below.

The apparatus for measuring multipath propagation characteristics according to the twelfth embodiment constitutes an application of the apparatus according to the ninth and eleventh embodiments of the present invention, and is basically the same as the apparatus according to the first embodiment.

An analyzer in a receiver in the apparatus according to the twelfth embodiment determines amplitude frequency characteristics $G_i(f)$ in the same manner as with the ninth embodiment.

The amplitude frequency characteristics $G_i(f)$ are expressed by a series expansion according to the following equations (15a), (15b):

$$G_i(\Delta f) = a_0 + a_1 \Delta f + a_2 \Delta f^2 + \ldots + a_n \Delta f^n \tag{15a}$$

$$a_i = \left| \frac{d^i g_i(f)}{df^i} \right|_{f=f_0} \tag{15b}$$

A bit-error rate BER is expressed using D/(N+U) and $a_1$, $a_2$, $a_3$ according to the following equation (16):

$$BER = E(D/U, C/N, a_1, a_2, a_3) \tag{16}$$

The above relationship is determined by simulations and experiments, and the bit-error rate BER is estimated from the measured values.

An apparatus for measuring multipath propagation characteristics according to a thirteenth embodiment of the present invention will be described below.

The apparatus for measuring multipath propagation characteristics according to the thirteenth embodiment constitutes an application of the apparatus according to the tenth and eleventh embodiments of the present invention, and is basically the as the apparatus according to the first embodiment.

An analyzer in a receiver in the apparatus according to the thirteenth embodiment detects a notch $N_h$, and determines a notch frequency $N_f$ and a notch depth $N_D$ based on the detected notch $N_h$. The ratios D/U, C/N are determined in the same manner as with the eleventh embodiment.

A bit-error rate BER is expressed according to the following equation (17):

$$BER = E(D/U, C/N, N_f, N_D) \tag{17}$$

The above relationship is determined by simulations and experiments, and the bit-error rate BER is estimated from the measured values.

Figure 15:
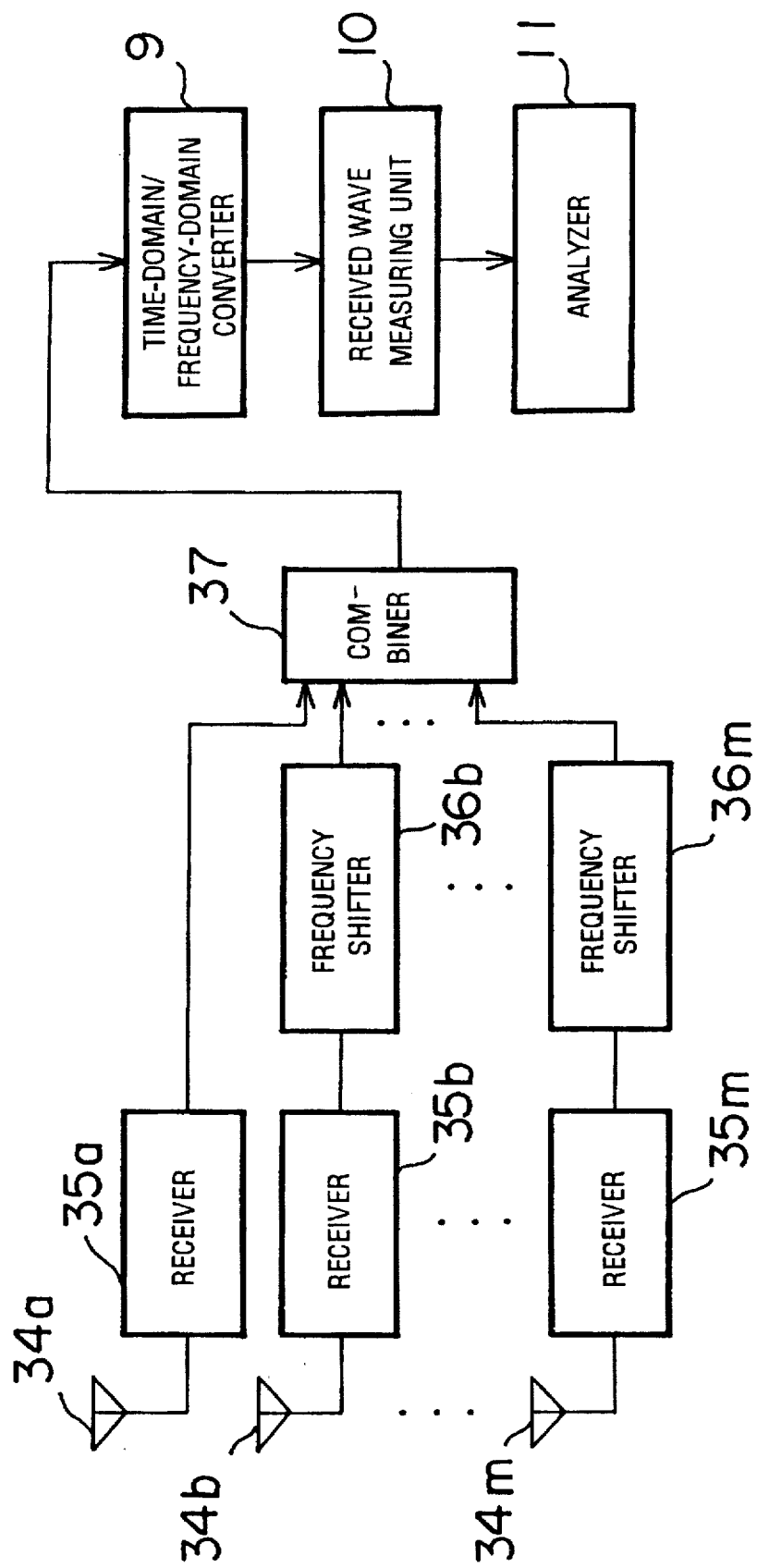
FIG. 15 is a block diagram of a receiver in an apparatus for measuring multipath propagation characteristics according to a fourteenth embodiment of the present invention.

An apparatus for measuring multipath propagation characteristics according to a fourteenth embodiment of the present invention will be described below with reference to FIG. 15.

The apparatus according to the fourteenth embodiment has a plurality of transmitters which are identical to those of the apparatus according to the first embodiment. The receiver in the apparatus for measuring multipath propagation characteristics according to the fourteenth embodiment is based on the receiver in the apparatus for measuring multipath propagation characteristics according to the first embodiment. FIG. 15 shows in block form the receiver in the apparatus for measuring multipath propagation characteristics according to the fourteenth embodiment. Those parts of the receiver in the apparatus according to the fourteenth embodiment shown in FIG. 15 which are identical to those of the apparatus according to the first embodiment are denoted by identical reference numerals and will not be described in detail below.

According to the fourteenth embodiment, the receiver has a plurality of directional antennas $34a-34m$ which are three-dimensionally installed such that a directivity pattern composed of a combination of the directivity patterns of the directional antennas $34a-34m$ has a wide angle. The receiver also has a plurality of receiving units $35a-35m$ connected to the respective directional antennas $34a-34m$. Each of the receiving units $35a-35m$ is of a structure identical to the receiving unit 8 according to the first embodiment. The receiving units $35b-35m$ are connected respectively to frequency shifters $36b-36m$ which serve to shift the frequencies of waves received by the receiving units $35b-35m$ by mutually different degrees. Output signals from the receiving unit $35a$ and the frequency shifters $36b-36m$ are supplied to a combiner 37 which combines the supplied signals.

Figure 16:
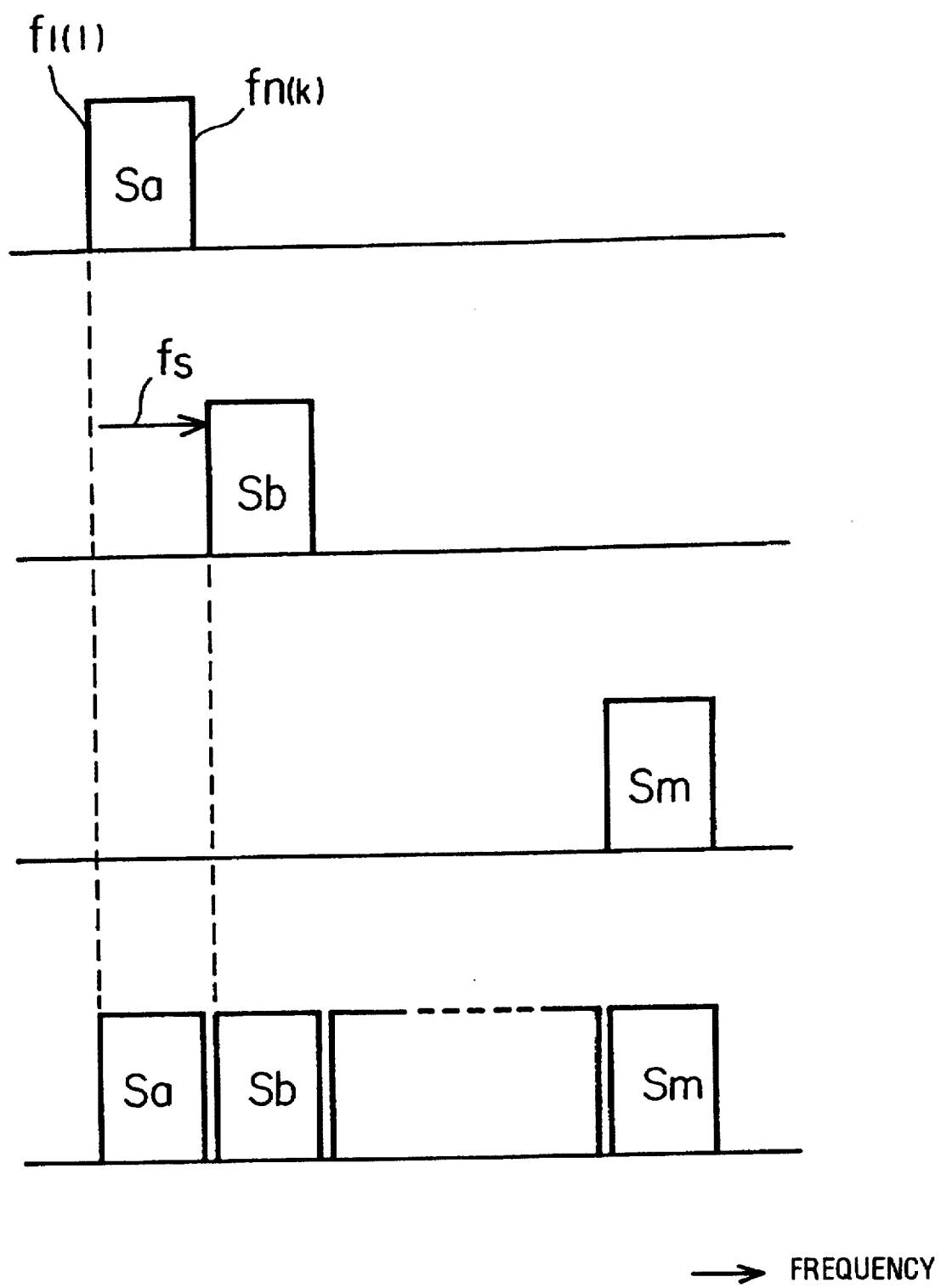
FIG. 16 is a diagram showing an arrangement of frequencies.

Operation of the frequency shifters $36b-36m$ will be described below with reference to FIG. 16.

The receiving units $35a-35m$ operate in the same manner as the receiving unit 8 according to the first embodiment. The waves received by the respective receiving units $35a-35m$ each have a spectrum Sa. That is, the spectrum Sa is composed of spectral components $f_{1(1)}-f_{n(k)}$, as with the spectrum shown in FIG. 5 according to the first embodiment. The frequency shifter $36b$ shifts the received wave with the spectrum Sa by a frequency fs, thus generating a received wave having a spectrum Sb, and outputs the generated received wave to the combiner 37. The next frequency shifter $36c$ shifts the received wave with the spectrum Sa by a frequency 2fs, and outputs the shifted received wave to the combiner 37. In this fashion, the frequency shifters successively shift the frequencies of the received waves. When the received waves supplied to the combiner 37 are combined by the combiner 37, the combiner 37 produces a combined signal having a combined spectrum having spectral components which doe not overlap each other and composed of the spectrums Sa, Sb, . . . Sm that are closely arranged. The combined signal is then converted into a spectrum in the frequency domain by the time-domain/frequency-domain converter 9 in the same manner as with the first embodiment, the spectrum being shown at the bottom in FIG. 16.

Characteristics for space diversity transmission and diversity reception can be obtained on the basis of the spectrum thus produced.

An apparatus for measuring multipath propagation characteristics according to a fifteenth embodiment of the present invention will be described below with reference to FIG. 17.

Figure 17:
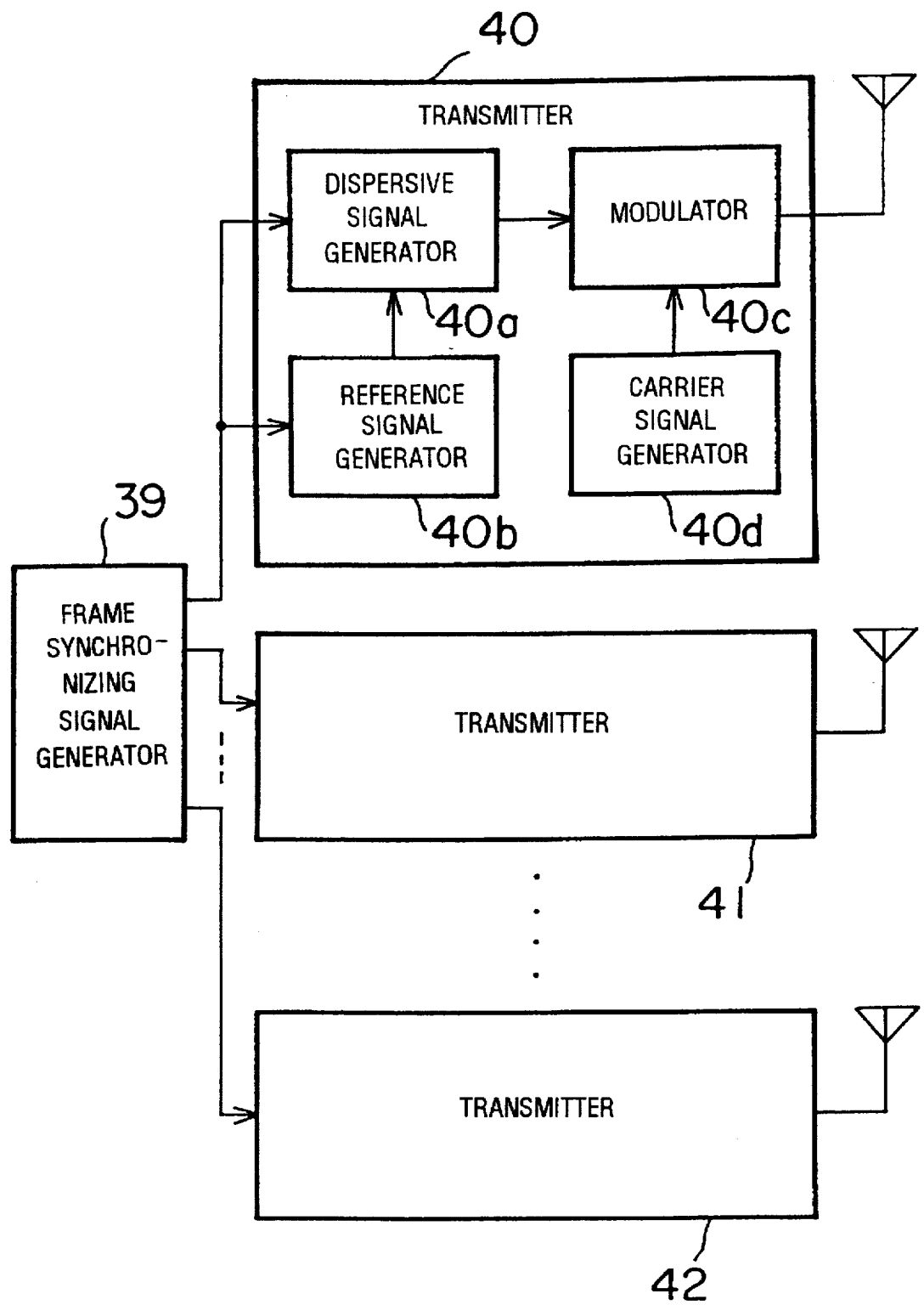
FIG. 17 is a block diagram of transmitters in an apparatus for measuring multipath propagation characteristics according to a fifteenth embodiment of the present invention.

The apparatus according to the fifteenth embodiment has a plurality of transmitters 40, 41, 42 each as shown in FIG. 17. The apparatus according to the fifteenth embodiment also has a frame synchronizing signal generator 39 for supplying identical frame synchronizing signals to the transmitters 40, 41, 42. The transmitters 40, 41, 42 are identical in structure to each other. The transmitter 40 comprises a dispersive signal generator 40a, a standard signal generator 40b, a modulator 40c, and a carrier signal generator 40d. The standard signal generator 40b generates a clock signal based on the frame synchronizing signal supplied from the frame synchronizing signal generator 39, and supplies the generated clock signal to the dispersive signal generator 40a. The dispersive signal generator 40a synchronizes frames based on the supplied frame synchronizing signal, and generates a dispersive signal based on the clock signal. The modulator 40c and the carrier signal generator 40d operate in the same manner as the modulator 6 and the carrier signal generator 7 according to the first embodiment. According to the fifteenth embodiment, therefore, the frames of transmitted waves outputted from the transmitters are in complete synchronism with each other.

Figure 18:
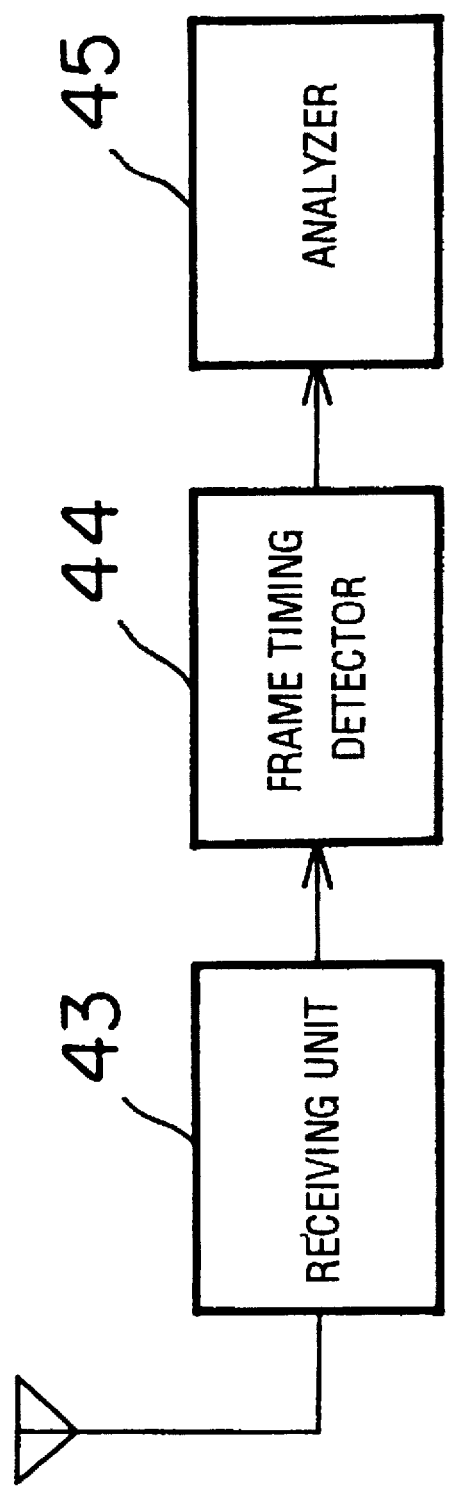
FIG. 18 is a block diagram of a receiver in the apparatus for measuring multipath propagation characteristics according to the fifteenth embodiment of the present invention.

The measuring apparatus according to the fifteenth embodiment also has a receiver as shown in FIG. 18. The receiver comprises a receiving unit 43, a frame timing detector 44, and an analyzer 45. The receiving unit 43, which is identical to the receiving unit 8 according to the first embodiment, simultaneously receives transmitted waves from the transmitters 40–42, and converts the received waves into respective IF signals. The frame timing detector 44 detects the timing of the frames of the received waves, and sends the detected timing to the analyzer 45. Based on the supplied timing of the frames of the received waves, the analyzer 45 calculates absolute delay times from the transmitters and relative delay times between the transmitters.

Specifically, a dispersive signal is expressed in a frequency expansion according to the following equation (18):

$$S_{ig} = \sum_{n=-n}^{n} a_n e^{j\Delta\omega n t} \quad (18)$$

If it is assumed that a carrier angular frequency is represented by $\omega_0$ and the carrier is modu-lated with the dispersive signal by BPSK, then a modulated wave C is expressed according to the following equation (19):

$$C = e^{j\omega t} \sum_{n=-n}^{n} a_n e^{j\Delta\omega n t} \quad (19)$$

If the modulated wave C arrives a time $\Delta t$ after it has been transmitted, then a received wave $C_r$ is expressed according to the following equation (19):

$$C_r = e^{j\omega(t-\Delta t)} \sum_{n=-n}^{n} a_n e^{j\Delta\omega n(t-\Delta t)} \quad (20)$$

If $\omega(t-\Delta t)$ is undefined and the angular frequency $\omega_0$ is used as a reference, then the phase $\theta_n(t_0)$ of each spectrum at $t_0$ is given according to the following equation (21):

$$\theta_n(t_0) = \Delta\omega \cdot n(t_0 - \Delta t) \quad (21).$$

If a deviation of a $\delta\omega$ is sufficiently smaller than $\Delta\omega$ by using a highly stable oscillator, then the absolute delay time $\Delta t$ is calculated according to the following equation (22):

$$\Delta t = [\theta_n(t_0) - \Delta\omega \cdot n t_0]/\Delta\omega \cdot n \quad (22).$$

The relative delay time a $t_{nm}$ is calculated according to the following equation (23):

$$\delta t_{nm} = \Delta t_n - \Delta t_m \quad (23).$$

According to the present invention, as described above, an apparatus for measuring multipath propagation characteristics comprises a plurality of transmitters located in different spatial positions, respectively, and a receiver for receiving a plurality of waves transmitted from the transmitters while the receiver is moving. The transmitters generate respective waves to be transmitted that each comprise a plurality of discrete spectral components which are arranged in the frequency domain such that they do not overlap each other in the same frequency band. The receiver simultaneously receives the waves which have been transmitted from the respective transmitters and each propagated over a plurality of different propagation routes or paths while being subjected to multipath fading, and measures multipath propagation characteristics relative to the propagation paths based on the received waves.

With such an arrangement, since the spectral components of a spectrum produced by the receiver are sufficiently separate from each other, it is possible to simultaneously analyze the transmitted waves. The spectral components have been propagated over respective different propagation routes or paths and hence subjected to multipath fading in those propagation routes or paths. Therefore, the multipath propagation characteristics relative to the propagation paths can be determined by analyzing the spectral components.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for measuring multipath propagation characteristics based on a plurality of received transmitted waves that have been propagated over a plurality of different propagation paths while being subjected to multipath fading, comprising:

a plurality of transmitters located in different spatial positions, respectively, for generating respective waves to be transmitted that each comprise a plurality of discrete spectral components which are arranged in the frequency domain such that they do not overlap each other in the same frequency band; and a movable receiver for simultaneously receiving the waves which have been transmitted from said respective transmitters and each propagated over a plurality of different propagation paths while being subjected to multipath fading, and measuring multipath propagation characteristics relative to the paths based on the received waves.

2. An apparatus according to claim 1, wherein each of said transmitters comprises:

dispersing signal generating means for generating dispersive signal;

modulating means for modulating carrier with the dispersive signal generated by said dispersing signal generating means; and radiating means for radiating the carrier modulated by said modulating means into space.

3. An apparatus according to claim 1, wherein said movable receiver comprises:

receiving means for simultaneously receiving the waves transmitted from said transmitters, respectively;

converting means for converting the received waves into spectrums in the frequency domain; and analyzing means for analyzing multipath propagation characteristics based on said spectrums.

4. An apparatus according to claim 1, wherein each of said transmitter comprises:

dispersive signal generating means for generating dispersive signal;

modulating means for modulating carrier having a frequency different from frequencies which carriers of the other modulating means have with the dispersive signal generated by said dispersing signal generating means; and radiating means for radiating the carrier modulated by said modulating means into space.

5. An apparatus according to claim 1, wherein said transmitters comprise:

means for transmitting the waves such that all the spectral components thereof are discretely arranged in the frequency domain so as not to overlap each other.

6. An apparatus according to claim 1, wherein said movable receiver comprises:

receiving means for simultaneously receiving the waves transmitted from said transmitters, respectively;

converting means for converting the received waves into spectrums in the frequency domain;

removing means for removing from the spectrums those spectral components of the spectrums which are spaced at frequency intervals smaller than a predetermined frequency interval, and outputting an output signal indicative of the spectrums from which those spectral components have been removed; and analyzing means for analyzing multipath:. propagation characteristics based on said output signal from said removing means.

7. An apparatus according to claim 1, wherein each of said transmitters comprises:

dispersive signal generating means for generating dispersive signal, at the same time interval as the other dispersive signal generating means;

modulating means for modulating carrier having a frequency different from frequencies which carriers of the other modulating means have with the dispersive signal generated by said dispersing signal generating means; and radiating means for radiating the carrier modulated by said modulating means into space.

8. An apparatus according to claim 1, wherein said movable receiver comprises:

direct receiving means for directly receiving the waves transmitted from said transmitters, respectively, not via the propagation paths;

first converting means for converting the directly received waves into spectrums in the frequency domain;

memory means for storing the spectrums produced by said first converting means;

receiving means for simultaneously receiving the waves transmitted from said transmitters, respectively, and propagated over the propagation paths;

second converting means for converting the waves received by said receiving means into a spectrum in the frequency domain; and analyzing means for correcting the spectrums produced by said second converting means with the spectrums stored by said memory means, and analyzing multipath propagation characteristics based on the corrected spectrums.

9. An apparatus according to claim 1, wherein said movable receiver comprises:

selective control means for producing an output signal to control selection of one, at a time, of a plurality of reception bands;

receiving means for selecting one, at a time, of a plurality of reception bands thereof in response to the output signal from said selective control means, and simultaneously receiving the waves transmitted from said transmitters, respectively, in said selected one of the reception bands;

converting means for converting the received waves into spectrums in the frequency domain; and analyzing means for analyzing multipath propagation characteristics based on said spectrums.

10. An apparatus according to claim 1, wherein said movable receiver comprises:

receiving means for simultaneously receiving the waves transmitted from said transmitters, respectively;

converting means for converting the received waves into spectrums in the frequency domain; and analyzing means for calculating electric power values and phases of the respective spectral components based on said spectrums thereby to analyze multipath propagation characteristics.

11. An apparatus according to claim 1, wherein said movable receiver comprises:

receiving means for simultaneously receiving the waves transmitted from said transmitters, respectively;

converting means for converting the received waves into spectrums in the frequency domain;

vector synthesizing means for calculating electric power values and phases of the respective spectral components based on said spectrums, and synthesizing vectors of the respective received waves; and analyzing means for determining carrier phase rotation characteristics of the received waves based on the vectors synthesized by said vector synthesizing means.

12. An apparatus according to claim 1, wherein said movable receiver comprises:

receiving means for simultaneously receiving the waves transmitted from said transmitters, respectively;

converting means for converting the received waves into spectrums in the frequency domain;

correcting means for correcting said spectrums for a processing time required by said converting means;

vector synthesizing means for calculating electric power values and phases of the respective spectral components based on said spectrums corrected by said correcting means thereby to synthesize vectors of the respective received waves; and analyzing means for analyzing multipath propagation characteristics based on the vectors which are synthesized a plurality of times by said vector synthesizing means.

13. An apparatus according to claim 1, wherein said movable receiver comprises:

memory means for previously storing electric power values in the frequency domain and corrective values for phases of the waves transmitted from said transmitters;

receiving means for simultaneously receiving the waves transmitted from said transmitters, respectively, over the propagation paths;

converting means for converting the received waves into spectrums in the frequency domain; and analyzing means for correcting said spectrums with the electric power values and corrective values for phases which are stored by said memory means, and analyzing multipath propagation characteristics based on the corrected spectrums.

14. An apparatus according to claim 1, wherein said movable receiver comprises:

receiving means for simultaneously receiving the waves transmitted from said transmitters, respectively;

converting means for converting the received waves into spectrums in the frequency domain; and analyzing means for analyzing self frequency correlations of the received waves based on said spectrums.

15. An apparatus according to claim 1, wherein said movable receiver comprises:

receiving means for simultaneously receiving the waves transmitted from said transmitters, respectively;

converting means for converting the received waves into spectrums in the frequency domain; and analyzing means for determining a desired-to-undesired power ratio, a carrier-to-noise power ratio, and a transfer function or an amplitude notch in a transmission band, based on said spectrums, and estimating the transmitted quality of the received waves based on the desired-to-undesired power ratio, the carrier-to-noise power ratio, and the transfer function or the amplitude notch in the transmission band which have been determined.

16. An apparatus according to claim 1, wherein said movable receiver comprises:

a plurality of antennas having respective directivity patterns and three-dimensionally installed such that a directivity pattern composed of a combination of said directivity patterns has a wide angle;

a plurality of receiving means connected respectively to said antennas for simultaneously receiving the waves transmitted from said transmitters, respectively;

a plurality of frequency shifting means connected to said receiving means, respectively, for shifting frequencies of the received waves by respective different degrees;

combining means for combining the received waves whose frequencies have been shifted by said frequency shifting means;

converting means for converting an output signal from said combining means into a spectrum in the frequency domain; and analyzing means analyzing multipath propagation characteristics based on said spectrum.

17. An apparatus according to claim 1, wherein said transmitters comprise:

respective dispersive signal generating means for generating dispersive signals, respectively;

respective modulating means for modulating respective carriers with the dispersive signals generated by said dispersing signal generating means, respectively;

respective radiating means for radiating the carriers modulated by said modulating means into space, respectively;

frame synchronizing means for synchronizing frames of the dispersive signals generated by said dispersing signal generating means; and wherein said movable receiver comprises:

receiving means for receiving the waves transmitted from said transmitters, respectively;

frame timing detecting means for detecting the respective timing of frames of the received waves; and analyzing means for analyzing absolute delay times from said transmitters and relative delay times between said transmitters based on the detected timing of the frames of the received waves.

18. An apparatus according to claim 17, wherein said frame synchronizing means comprises frame synchronizing signal delivering means for delivering a frame synchronizing signal to said transmitters, and said dispersive signal generating means comprise respective means for generating dispersive signals in synchronism with the frames based on said frame synchronizing signal.

* * * * *